(12) United States Patent
Yokoyama et al.

(10) Patent No.: US 8,483,184 B2
(45) Date of Patent: Jul. 9, 2013

(54) HANDOVER CONTROL APPARATUS, MOBILE STATION, BASE STATION, HANDOVER CONTROL SERVER, AND HANDOVER CONTROL METHOD

(75) Inventors: Hitoshi Yokoyama, Kawasaki (JP); Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 12/724,718

(22) Filed: Mar. 16, 2010

(65) Prior Publication Data

US 2010/0172329 A1 Jul. 8, 2010

Related U.S. Application Data

(63) Continuation of application No. PCT/JP2007/069310, filed on Oct. 2, 2007.

(51) Int. Cl.
*H04W 4/00* (2009.01)

(52) U.S. Cl.
USPC .......................................................... 370/332

(58) Field of Classification Search
USPC ......... 370/203, 204–215, 229–240, 241–253, 370/310–337, 338–350, 395.1, 395.3, 395.4, 370/395.41, 395.42, 395.5, 395.52, 395.53, 370/412–421, 431–457, 458–463, 464–497, 370/498–522, 523–520, 521–529
See application file for complete search history.

(56) References Cited

U.S. PATENT DOCUMENTS

| | | | |
|---|---|---|---|
| 5,475,677 A * | 12/1995 | Arnold et al. ................. | 370/280 |
| 6,366,763 B1 * | 4/2002 | Ue et al. ........................... | 455/69 |
| 6,400,929 B1 * | 6/2002 | Ue et al. ............................ | 455/69 |
| 6,470,188 B1 * | 10/2002 | Ohtani et al. .................. | 455/503 |
| 6,487,394 B1 * | 11/2002 | Ue et al. ............................ | 455/69 |
| 6,505,035 B2 * | 1/2003 | Ue et al. ............................ | 455/69 |
| 6,584,325 B1 | 6/2003 | Shakhgildian | |
| 6,591,104 B2 * | 7/2003 | Ohtani et al. .................. | 455/436 |
| 6,597,894 B1 * | 7/2003 | Ue et al. ............................ | 455/69 |
| 6,603,748 B1 | 8/2003 | Lu et al. | |

(Continued)

FOREIGN PATENT DOCUMENTS

| | | |
|---|---|---|
| JP | 07-075154 | 3/1995 |
| JP | 2000-269881 | 9/2000 |

(Continued)

OTHER PUBLICATIONS

International Search Report for corresponding International Patent Application No. PCT/JP2007/069310, mailed Nov. 13, 2007, with English translation attached.

(Continued)

*Primary Examiner* — Jung-Jen Liu
(74) *Attorney, Agent, or Firm* — Myers Wolin, LLC

(57) ABSTRACT

In handover control, a data collection unit collects measurement data that indicates communication quality of uplink and downlink paths between a mobile station and base stations. A candidate evaluation unit evaluates which base station is optimal for uplink, as well as which base station is optimal for downlink, based on the measurement data. A station selection unit determines which link has priority, either uplink or downlink, according to the class of data services that the mobile station uses in radio communication, and selects as a target base station for handover the base station that has been determined as being optimal for the link having priority.

15 Claims, 36 Drawing Sheets

U.S. PATENT DOCUMENTS

| | | | |
|---|---|---|---|
| 6,628,924 B1* | 9/2003 | Miyamoto | 455/69 |
| 6,747,963 B1* | 6/2004 | Park et al. | 370/335 |
| 6,823,193 B1* | 11/2004 | Persson et al. | 455/522 |
| 6,847,818 B1* | 1/2005 | Furukawa | 455/442 |
| 6,907,245 B2* | 6/2005 | Ohlsson et al. | 455/442 |
| 6,917,607 B1* | 7/2005 | Yeom et al. | 370/342 |
| 6,973,289 B2* | 12/2005 | Ue et al. | 455/69 |
| 6,977,903 B1* | 12/2005 | Ohtani et al. | 370/252 |
| 6,982,957 B2* | 1/2006 | Kiiski et al. | 370/235 |
| 7,006,482 B1* | 2/2006 | Choi et al. | 370/342 |
| 7,043,273 B2* | 5/2006 | Sarresh et al. | 455/562.1 |
| 7,085,254 B1* | 8/2006 | Yun et al. | 370/342 |
| 7,085,294 B2* | 8/2006 | Longoni et al. | 370/509 |
| 7,151,934 B2* | 12/2006 | Nishimura et al. | 455/442 |
| 7,227,850 B2* | 6/2007 | Dahlman et al. | 370/330 |
| 7,236,787 B1* | 6/2007 | Tamura et al. | 455/437 |
| 7,242,959 B2* | 7/2007 | Furukawa | 455/525 |
| 7,269,422 B2* | 9/2007 | Gunnarsson et al. | 455/442 |
| 7,340,268 B2* | 3/2008 | Oh et al. | 455/522 |
| 7,383,045 B2* | 6/2008 | Tamura et al. | 455/433 |
| 7,395,092 B2* | 7/2008 | Moon et al. | 455/560 |
| 7,437,175 B2* | 10/2008 | Lindoff et al. | 455/522 |
| 7,483,712 B2* | 1/2009 | Komatsu | 455/522 |
| 7,577,435 B2* | 8/2009 | Tamura et al. | 455/436 |
| 7,627,336 B2* | 12/2009 | Carlsson et al. | 455/522 |
| 7,630,716 B2* | 12/2009 | Tamura et al. | 455/439 |
| 7,636,551 B2* | 12/2009 | Ue et al. | 455/63.1 |
| 7,664,507 B2* | 2/2010 | Tamura et al. | 455/450 |
| 7,676,227 B2* | 3/2010 | Shinozaki | 455/437 |
| 7,688,799 B2* | 3/2010 | Yamamoto | 370/345 |
| 7,724,768 B2* | 5/2010 | Carlsson et al. | 370/465 |
| 7,792,531 B2* | 9/2010 | Tamura et al. | 455/439 |
| 7,907,730 B2* | 3/2011 | Tamura et al. | 380/255 |
| 7,912,493 B2* | 3/2011 | Furukawa | 455/525 |
| 7,953,414 B2* | 5/2011 | Tamura et al. | 455/436 |
| 8,050,222 B2* | 11/2011 | Maeda et al. | 370/329 |
| 8,078,177 B2* | 12/2011 | Lindoff | 455/442 |
| 2003/0073455 A1* | 4/2003 | Hashem et al. | 455/525 |
| 2004/0180701 A1* | 9/2004 | Livet et al. | 455/574 |
| 2006/0178167 A1* | 8/2006 | Tamura et al. | 455/560 |
| 2006/0194583 A1* | 8/2006 | Tamura et al. | 455/442 |
| 2006/0199578 A1* | 9/2006 | Tamura et al. | 455/422.1 |
| 2006/0251038 A1* | 11/2006 | Tamura et al. | 370/342 |
| 2006/0264207 A1* | 11/2006 | Tamura et al. | 455/415 |
| 2007/0072610 A1* | 3/2007 | Qiao et al. | 455/436 |
| 2007/0298804 A1* | 12/2007 | Tamura et al. | 455/437 |
| 2008/0108356 A1* | 5/2008 | Tamura et al. | 455/445 |
| 2009/0141687 A1* | 6/2009 | Tamura et al. | 370/331 |
| 2009/0149181 A1* | 6/2009 | Tamura et al. | 455/436 |
| 2009/0149182 A1* | 6/2009 | Tamura et al. | 455/436 |
| 2009/0154702 A1* | 6/2009 | Tamura et al. | 380/270 |
| 2009/0190761 A1* | 7/2009 | Tamura et al. | 380/270 |
| 2009/0191924 A1* | 7/2009 | Tamura et al. | 455/571 |
| 2009/0197646 A1* | 8/2009 | Tamura et al. | 455/561 |

FOREIGN PATENT DOCUMENTS

| | | |
|---|---|---|
| JP | 2000-270356 | 9/2000 |
| JP | 2000-333265 | 11/2000 |
| JP | 2004-297426 | 10/2004 |
| JP | 2005-101930 | 4/2005 |
| JP | 2005-509327 | 4/2005 |
| JP | 2006-303739 | 11/2006 |
| WO | 02/100125 | 12/2002 |

OTHER PUBLICATIONS

The extended European search report includes European search opinion, issued for corresponding European Patent Application No. 07829050.9 dated Sep. 12, 2012.

* cited by examiner

FIG. 5

170  
HO MANAGEMENT MEMORY  
171

| MEASUREMENT VALUE TABLE (SYSTEM A/STATION a1) | | |
|---|---|---|
| INDICATOR NAME | UPLINK VALUE | DOWNLINK VALUE |
| PROPAGATION LOSS | 90.1 dB | 90.2 dB |
| SIR | -5.1 dB | 4.7 dB |
| PROPAGATION DELAY | 2.3 us | 2.4 us |
| NUMBER OF EFFECTIVE ANTENNAS | 4 elements | 2 elements |
| ⋮ | ⋮ | ⋮ |

FIG. 6

170 HO MANAGEMENT MEMORY

172 CHARACTERISTIC VALUE TABLE (SYSTEM A)

| INDICATOR NAME | UPLINK VALUE | DOWNLINK VALUE |
|---|---|---|
| QoS | 10.5 us | 12.4 us |
| THROUGHPUT | 0.7 Mbps | 7.5 Mbps |
| PACKET FEE | 10 Yen/Mbyte ||
| STANDBY POWER CONSUMPTION | 6 mW ||
| ⋮ | ⋮ | ⋮ |

FIG. 7

170 HO MANAGEMENT MEMORY

173

| BASE STATION TABLE | | |
| --- | --- | --- |
| TYPE | SYSTEM NAME | BASE STATION NAME |
| STANDBY | SYSTEM A | STATION a1 |
| UPLINK | SYSTEM B | STATION b1 |
| DOWNLINK | SYSTEM A | STATION a2 |

HO MANAGEMENT MEMORY

174

| BASE STATION TABLE | | | |
|---|---|---|---|
| SERVICE NAME | TYPE | SYSTEM NAME | BASE STATION NAME |
| - | STANDBY | SYSTEM A | STATION a1 |
| Web | UPLINK | SYSTEM B | STATION b1 |
| | DOWNLINK | SYSTEM A | STATION a2 |
| Movie | UPLINK | SYSTEM B | STATION b2 |
| | DOWNLINK | SYSTEM A | STATION a2 |
| ⋮ | ⋮ | ⋮ | ⋮ |

HO MANAGEMENT MEMORY

175

| INDICATOR AXIS TABLE | |
|---|---|
| SERVICE NAME | INDICATOR NAME |
| Mail (Send) | QoS (Uplink) |
| Mail (Receive) | <maintain> |
| VoIP | QoS |
| FTP (Receive) | Throughput (Downlink) |
| Web (Receive) | Standby Power Consumption |
| Movie (Receive) | Packet Fee |
| ⋮ | ⋮ |

FIG. 20

170 HO MANAGEMENT MEMORY

176 BASE STATION TABLE

| TYPE | SYSTEM NAME | BASE STATION NAME |
|---|---|---|
| STANDBY | SYSTEM A | STATION a1 |
| UPLINK | SYSTEM A | STATION a1 |
| DOWNLINK | | STATION a2 |
| UPLINK | SYSTEM B | STATION b1 |
| DOWNLINK | | STATION b1 |

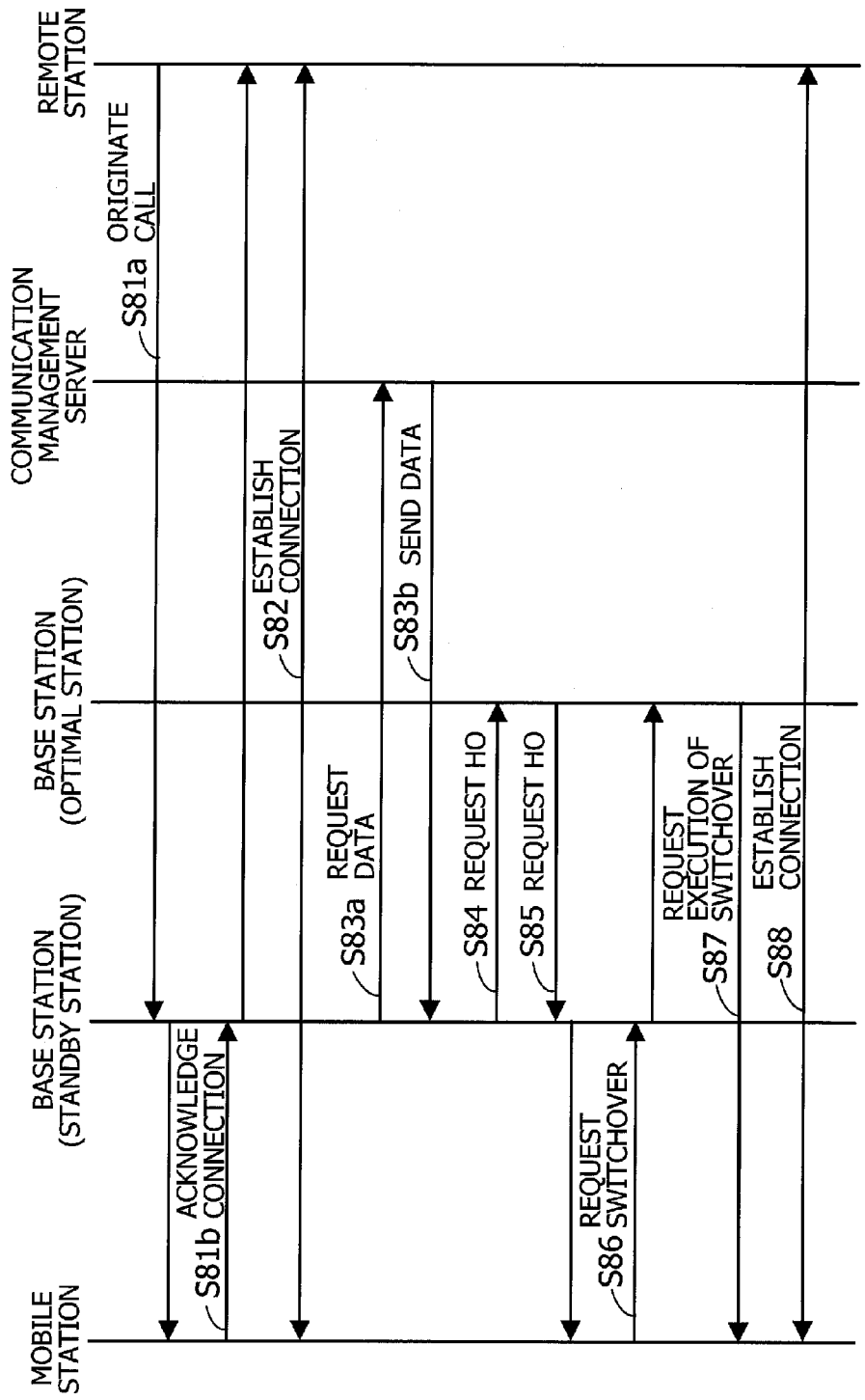

HANDOVER CONTROL APPARATUS, MOBILE STATION, BASE STATION, HANDOVER CONTROL SERVER, AND HANDOVER CONTROL METHOD

This application is a continuing application, filed under 35 U.S.C. §111(a), of International Application PCT/JP2007/069310, filed Oct. 2, 2007.

FIELD

The embodiments discussed herein are related to a handover control apparatus, mobile station, base station, handover control server, and handover control method.

BACKGROUND

Mobile communications systems are widely used today, including mobile phone systems and wireless local area networks (LAN). Many of those mobile communications systems use cellular technology, which partitions the service coverage area into a plurality of cells each containing a base station so that those base stations cooperate with each other to control communication. A mobile station in a cell is wirelessly connected to the base station of that cell. The mobile station can communicate with other mobile stations or computers via the base station.

A mobile station moving in a cellular system may encounter a situation where its connection has to be transferred from the current base station to another base station (called "handover"). Generally, the decision on whether to perform handover is made on the basis of communication quality of downlink paths. That is, the mobile station measures downlink communication quality based on a signal received from each base station, and initiates a handover operation if there is found a base station which provides better communication quality than the currently connected base station.

Conventionally the primary objective of mobile communications systems is to provide communication services over as wide an area as possible. Macro cells using high-power base stations have thus been deployed in preference to other types of cells. In recent years, however, mobile communications systems are more and more required to offer stable communication services with higher bitrates. For this reason, it is the current trend to deploy additional micro cells using low-power base stations, with the coverage overlapping with the existing macro cells.

The resulting mobile communications system thus includes base stations with different transmission powers. This system requires more complex communication control to make efficient use of radio resources. For example, the following techniques are known. One known technique selects a target station for handover in consideration of not only the magnitude of receive power from base stations, but also the power level of interference from the neighboring base stations, in order to prevent network connections from concentrating in a high-power base station (see, e.g., Japanese Laid-open Patent Publication No. 2000-270356). Another known technique suppresses the transmit power of a mobile station so as to control radio interference which could occur with the base stations surrounding the mobile station (see, e.g., Japanese Laid-open Patent Publication No. 2000-333265).

Yet another known technique selects a base station for uplink and a base station for downlink independently of each other, in the case where the communications system supports soft handover (see, e.g., Japanese Laid-open Patent Publication No. 2000-269881). Still another known technique uses a micro-cell base station for downlink and a macro-cell base station for uplink in the case where a plurality of micro cells are deployed in a macro cell (see, e.g., Japanese Laid-open Patent Publication No. 07-75154).

It is noted that none of the techniques described in the above-noted Japanese Laid-open Patent Publications Nos. 2000-270356, 2000-333265, 2000-269881, and 07-75154 provides sufficient flexibility in how to select a target base station for handover. In the actual communication context, the appropriateness of a base station selection depends also on what kind of data services (e.g., voice call, electronic mail transmission, file downloading) the mobile station uses when handover takes place. In respect of this issue, the techniques described in above-noted Japanese Laid-open Patent Publications Nos. 2000-270356, 2000-333265, 2000-269881, and 07-75154 may not always provide an optimal selection of base station.

In addition, the above-noted techniques described in Japanese Laid-open Patent Publications Nos. 2000-269881 and 07-75154 are limited in their range of applicable communications systems. For example, the technique described in Japanese Laid-open Patent Publication No. 2000-269881 requires the subject communications system to support soft handover. Further, the technique described in Japanese Laid-open Patent Publication No. 07-75154 assumes a fixed relationship between macro cells and micro cells.

SUMMARY

According to an aspect of the embodiments, a handover control method for a target base station for handover of a mobile station from among a plurality of base stations, the handover control method includes: collecting measurement data that indicates communication quality of uplink and downlink paths between the mobile station and each base station; evaluating which base station is optimal for uplink, as well as which base station is optimal for downlink, based on the collected measurement data; determining which link has priority, either uplink or downlink, according to a class of data services that the mobile station uses in radio communication; and selecting as a target base station for handover the base station that has been determined as being optimal for the link determined to have priority.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 provides an overview of an embodiment;

FIG. 5 illustrates a data structure of a measurement value table;

FIG. 6 illustrates a data structure of a characteristic value table;

FIG. 7 illustrates a data structure of a base station table according to the first embodiment;

FIG. 17 illustrates a data structure of a base station table according to a second embodiment;

FIG. 19 illustrates an example data structure of an indicator axis table;

FIG. 20 illustrates a structure of a base station table according to a third embodiment;

FIG. 36 is a second sequence diagram illustrating a communication flow according to the fifth embodiment.

DESCRIPTION OF EMBODIMENT(S)

Embodiments of the present invention will now be described in detail below with reference to the accompanying drawings. The description will begin with an overview of the present invention and then proceed to more specific embodiments.

Figure 1:
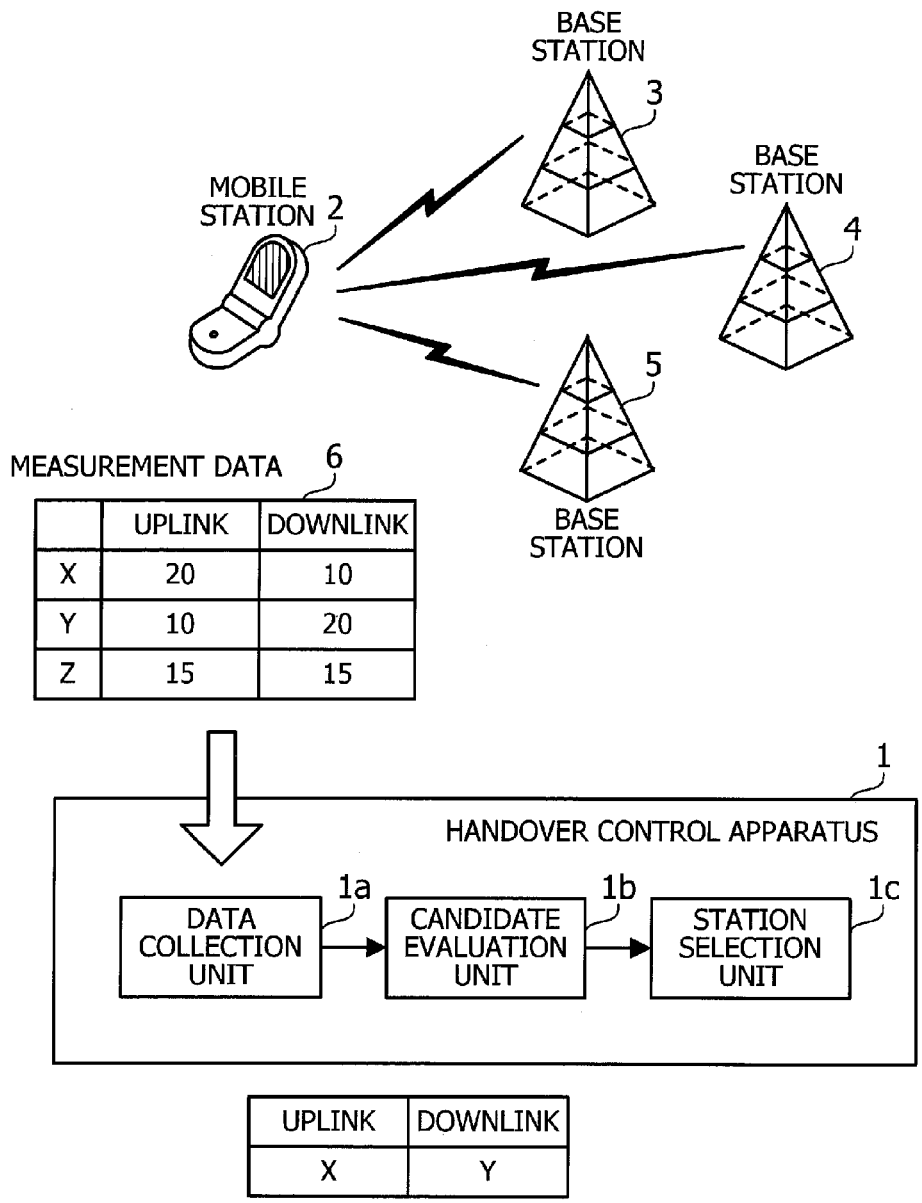

FIG. 1 provides an overview of an embodiment. The communications system illustrated in FIG. 1 is formed from a handover control apparatus 1, a mobile station 2, and base stations 3, 4, and 5. The handover control apparatus 1 controls a process of handover. When a mobile station 2 needs handover, the handover control apparatus 1 selects from among the base stations 3, 4, and 5 a target base station for handover. The mobile station 2 can communicate with the base stations 3, 4, and 5 via radio waves.

For example, the handover control apparatus 1 may be implemented as part of the mobile station 2. It is also possible to implement the handover control apparatus 1 in the base stations 3, 4, and 5, or in a server computer (not illustrated) connected to the base stations 3, 4, and 5 via a network. The handover control apparatus 1 includes a data collection unit 1a, a candidate evaluation unit 1b, and a station selection unit 1c.

The data collection unit 1a continuously collects measurement data 6 that indicates communication quality of uplink and downlink paths between the mobile station 2 and base stations 3, 4, and 5. There are several indicators representing communication quality, which include propagation loss, signal-to-interference ratio (SIR), and propagation delay, for example.

Uplink communication quality in the direction from the mobile station 2 to base stations 3, 4, and 5 can be observed at the base stations 3, 4, and 5. Downlink communication quality in the direction from the base stations 3, 4, and 5 to mobile station 2 can be observed at the mobile station 2. The data collection unit 1a collects measurement data 6 via different routes, depending on which device accommodates the handover control apparatus 1. The measurement data 6 may be transferred as necessary via an uplink or downlink between the mobile station 2 and base stations 3, 4, and 5, as well as via a network interconnecting the base stations 3, 4, and 5.

The candidate evaluation unit 1b evaluates which base station is optimal for uplink, as well as which base station is optimal for downlink, based on the measurement data 6 collected by the data collection unit 1a. Here, to be optimal means to provide the best communication quality. In the case where the measurement data 6 contains a plurality of indicator values, the candidate evaluation unit 1b chooses which indicator to use for the determination. The candidate evaluation unit 1b may choose a different indicator for each of the uplink and downlink. It is also possible for the candidate evaluation unit 1b to use a combination of two or more indicators for the determination.

The station selection unit 1c determines which link has priority, either uplink or downlink, according to the class of data services that the mobile station 2 uses in radio communication. In the case, for example, where the mobile station 2 uses a service of sending email messages, the station selection unit 1c determines to give priority to uplink since most traffic of that service goes through an uplink path. In the case where the mobile station 2 is to use a file download service, the station selection unit 1c determines to give priority to downlink since most traffic of that service goes through a downlink path.

The station selection unit 1c then selects, as a target base station for handover, the base station that the candidate evaluation unit 1b has determined as being optimal for the link having priority. The mobile station 2 and base stations 3, 4, and 5 are then informed, as necessary, of the selection of target base station.

Suppose now that the base station 3 ("X" in FIG. 1) has an uplink value of 20 and a downlink value of 10, as indicated in FIG. 1. Suppose also that the base station 4 ("Y" in FIG. 1) has an uplink value of 10 and a downlink value of 20, and the base station 5 ("Z" in FIG. 1) has an uplink value of 15 and a downlink value of 15. It is assumed here that larger values denote better communication qualities. In this case, the base station 3 is determined to be optimal for uplink, while the base station 4 is optimal for downlink. Accordingly, the handover process will select either the base station 3 or the base station 4, depending on what data service the mobile station 2 uses.

In operation of the above handover control apparatus 1, the data collection unit 1a collects measurement data 6 that indicates communication quality of uplink and downlink paths between the mobile station 2 and base stations 3, 4, and 5. Based on this measurement data 6, the candidate evaluation unit 1b evaluates which base station is optimal for uplink, as well as which base station is optimal for downlink. The station selection unit 1c determines which link has priority, either uplink or downlink, according to the class of data services that the mobile station 2 uses in radio communication. The base station that has been determined as being optimal for the link having priority is then selected as a target base station for handover.

This feature enables, in a handover operation, appropriate selection of a target base station suitable for the class of data services used. The described technique can be applied to various communications systems in a flexible way.

First Embodiment

A first embodiment will now be described in detail below with reference to the accompanying drawings.

Figure 2:
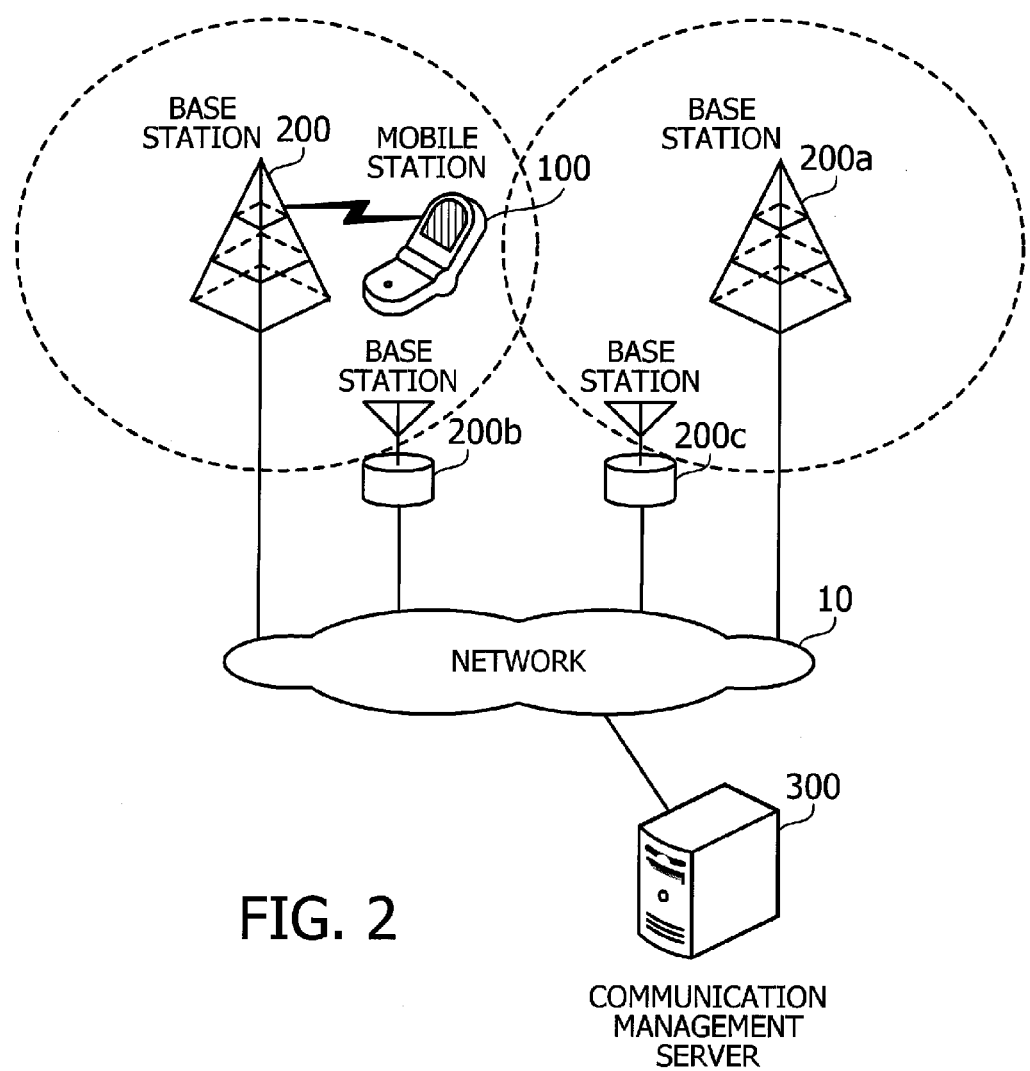
FIG. 2 illustrates a system arrangement of a communications system according to a first embodiment.

FIG. 2 illustrates a system arrangement of a communications system according to a first embodiment. The communications system of FIG. 2 is a radio communications system that permits a mobile station to communicate with another mobile station or computer via base stations. The communications system of the first embodiment is formed from a network 10, a mobile station 100, base stations 200, 200a, 200b, and 200c, and a communication management server 300. The network 10 is a wired or wireless network. The base stations 200, 200a, 200b, and 200c and communication management server 300 are connected to this network 10.

The mobile station 100 is a portable user terminal device such as mobile phone, personal digital assistant (PDA) device, and laptop computer. The mobile station 100 can communicate with a base station via radio waves when it is in the radio coverage area, or cell, of that base station. During that time, the mobile station 100 is allowed to use various data services, which include transmission and reception of email messages, uploading and downloading of files, and voice calls.

The mobile station 100 also controls handover. The mobile station 100 continuously collects measurement data indicating the quality of communication with the base stations 200, 200a, 200b, and 200c. Further, the mobile station 100 continuously communicates with the communication management server 300 to collect characteristics data indicating system characteristics of each communications system. Based on the collected measurement data and characteristics data, the mobile station 100 determines which base station to select as a target of handover.

The base stations 200, 200a, 200b, and 200c are communication devices used to transfer packet data between the mobile station 100 and a remote station. In response to a call originated by or addressed to the mobile station 100, the base stations 200, 200a, 200b, and 200c interact with the mobile station 100 by sending and receiving packet data, various control data, and pilot signals via radio communication channels. The base stations 200, 200a, 200b, and 200c also interact with the remote station communicating with the mobile station 100 by sending and receiving packet data over the network 10.

Two base stations 200 and 200a belong to one communications system. Another two base stations 200b and 200c belong to another communications system. The communications system of the base stations 200 and 200a is different from that of the base stations 200b and 200c. For example, the base stations 200 and 200a serve for a cellular phone system, whereas the base stations 200b and 200c serve for a public wireless LAN.

In the rest of this description, the communications system to which the base stations 200 and 200a belong is referred to by the name "system A." Likewise, the communications system to which the base stations 200b and 200c belong is referred to by the name "system B." Also, the base station 200 is referred to by the name "stational a1," and the base station 200a is referred to by the name "station a2." The base station 200b is referred to by the name "station b1," and the base station 200c is referred to by the name "station b2."

The communication management server 300 is a server computer that manages characteristics data indicating system characteristics of each communications system. The communication management server 300 updates the characteristics data regularly or irregularly. When a data request is received from a mobile station 100 via base stations 200, 200a, 200b, and 200c, the communication management server 300 sends such characteristics data to the mobile station 100. This communication management server 300 centrally manages characteristics data of all communications systems. Instead of employing such a communication management server 300, individual communications systems may have their own communication management servers to manage their local characteristics data.

The mobile station 100 and base stations 200, 200a, 200b, and 200c conform to Adaptive Modulation and Coding (AMC), as well as to Hybrid Automatic Repeat Request (HARQ), to optimize the configuration of radio communication, as necessary. AMC is a technique that changes modulation and coding methods according to communication quality as occasion demands. HARQ is a technique that corrects a packet error found at the receiving end, not discarding the corrupted packet, but using a retransmitted packet together with the corrupted packet.

The following will now describe what modules constitute the mobile station 100 and base station 200. Explanation of other base stations 200a, 200b, and 200c is omitted because they can be realized by using the same module arrangement as the base station 200.

Figure 3:
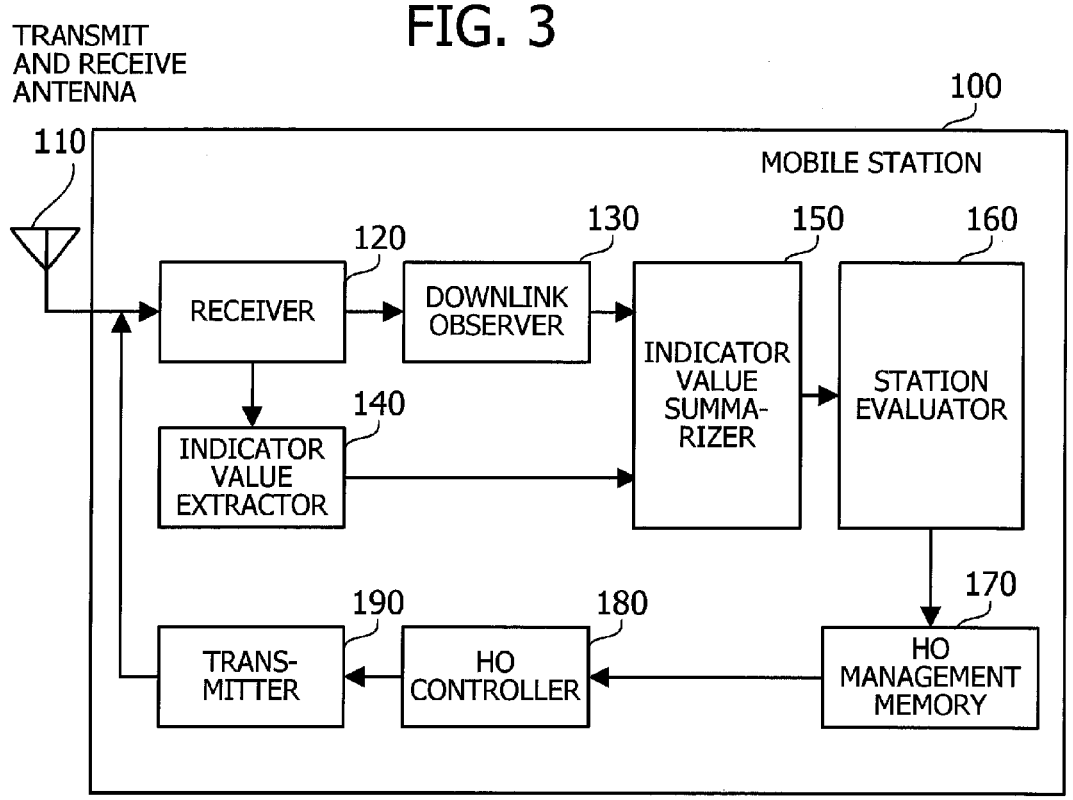
FIG. 3 is a block diagram illustrating functions of a mobile station according to the first embodiment.

FIG. 3 is a block diagram illustrating functions of a mobile station according to the first embodiment. This mobile station 100 includes a transmit and receive antenna 110, a receiver 120, a downlink observer 130, an indicator value extractor 140, an indicator value summarizer 150, a station evaluator 160, an HO management memory 170, an HO controller 180, and a transmitter 190. Note that FIG. 3 only depicts functions relating to handover control while omitting functions for ordinary call control.

The transmit and receive antenna 110 is a radio antenna used for both transmission and reception of signals. That is, the transmit and receive antenna 110 receives downlink signals that the base stations 200, 200a, 200b, and 200c transmit, and supplies them to the receiver 120. The transmit and receive antenna 110 also transmits radio waves of an uplink signal that the transmitter 190 produces.

Out of the receive signals supplied from the transmit and receive antenna 110, the receiver 120 extracts signals addressed thereto and subjects them to demodulation and decoding. The receiver 120 then supplies the demodulated and decoded data to the downlink observer 130 and indicator value extractor 140.

The downlink observer 130 extracts control data out of the data supplied from the receiver 120. This control data indicates the condition of radio waves transmitted by the source base station, such as the number of usable antennas and transmit power of the source base station. The downlink observer 130 extracts a pilot signal and measures the condition (e.g., downlink propagation loss and downlink SIR) of the downlink communication path by observing the extracted pilot signal. Then the downlink observer 130 supplies the obtained information, or downlink measurement data, to the indicator value summarizer 150.

Upon receipt of data from the receiver 120, the indicator value extractor 140 extracts uplink measurement data produced by base stations 200, 200a, 200b, and 200c if any such information is contained therein. The indicator value extractor 140 also extracts characteristics data sent from the communication management server 300 if any such information is contained in the received data. The indicator value extractor 140 then outputs the extracted data to the indicator value summarizer 150.

The indicator value summarizer 150 summarizes downlink measurement data supplied from the downlink observer 130 and uplink measurement data supplied from the indicator value extractor 140, on an individual base station basis. The indicator value summarizer 150 also summarizes characteristics data supplied from the indicator value extractor 140, on an individual communications system basis. Then the indicator value summarizer 150 outputs the summarized measurement data and characteristics data to the station evaluator 160.

Upon receipt of measurement data and characteristics data from the indicator value summarizer 150, the station evaluator 160 saves them in an HO management memory 170. Based on the measurement data and characteristics data, the station evaluator 160 compares base stations 200, 200a, 200b, and 200c with each other to determine which base station is optimal for standby, which base station is optimal for uplink communication, and which base station is optimal for downlink communication. The station evaluator 160 then saves the determination results in the HO management memory 170 as base station data. Detailed criteria for this determination will be described later.

The HO management memory 170 stores the latest measurement data indicating communication quality between the mobile station 100 and each base station, the latest characteristics data indicating system characteristics of each communications system, and the latest base station data indicating candidate base stations for connection. The measurement data, characteristics data, and base station data are updated by the station evaluator 160 as occasion demands.

The HO controller 180 monitors updates made to the base station data stored in the HO management memory 170. When the mobile station 100 has no ongoing communication session, the HO controller 180 informs the transmitter 190 of the optimal base station for standby, thus specifying a base station to which the mobile station 100 is to be connected. When, on the other hand, the mobile station 100 is engaged in a communication session, the HO controller 180 determines a priority link direction, i.e., which of the uplink and downlink directions is of priority, based on what data service is used in the communication session. The HO controller 180 then informs the transmitter 190 of the optimal base station for the priority link direction, to which the mobile station 100 is supposed to be connected. Detailed criteria for the determination of priority link direction will be described later.

The transmitter 190 performs coding and modulation of packet data, control data, and pilot signals produced in the mobile station 100, thereby generating an uplink signal addressed to the base station specified by the HO controller 180. The transmitter 190 outputs this uplink signal to the transmit and receive antenna 110. In addition to this, the transmitter 190 continuously sends a request signal for uplink measurement data, as well as a request signal for characteristics data, to the base station to which the mobile station 100 is currently connected. It is noted that the request interval of characteristics data may be substantially longer than that of measurement data.

The HO controller 180 may specify a base station that is different from the currently connected base station. If this is the case, the transmitter 190 invokes handover. Specifically, the transmitter 190 sends a handover request to the currently connected base station, confirms that all preparations are done on the base station side, and switches its connection to a new base station specified as the target of handover.

Figure 4:
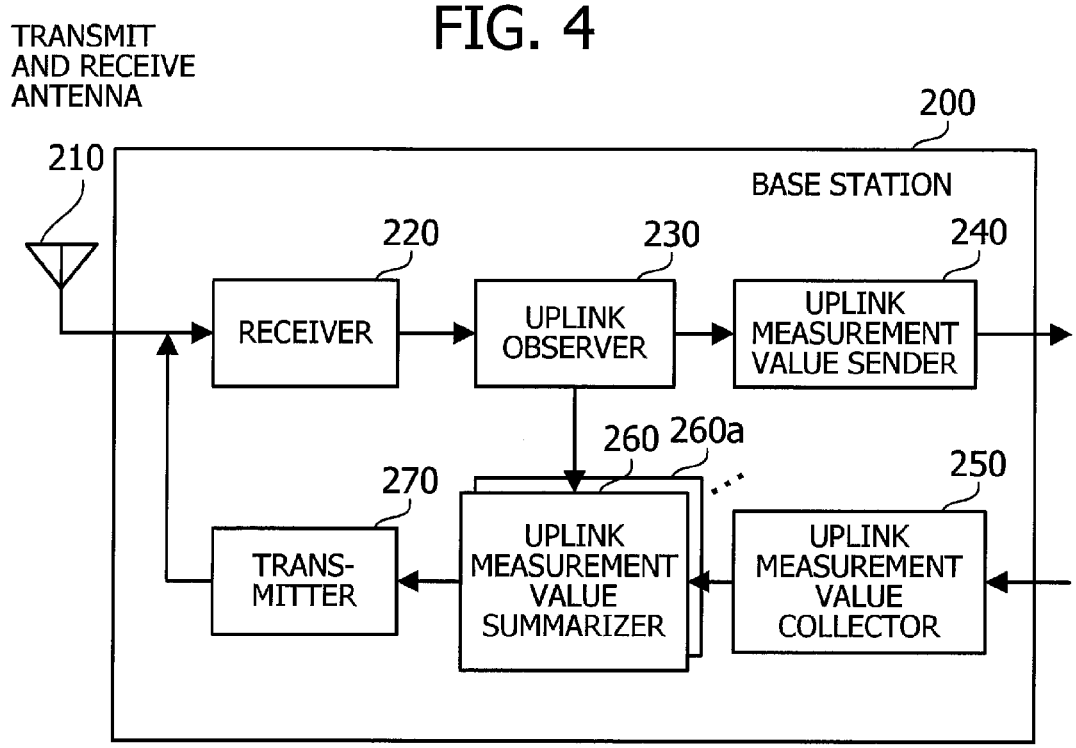
FIG. 4 is a block diagram illustrating functions of a base station according to the first embodiment.

FIG. 4 is a block diagram illustrating functions of a base station according to the first embodiment. This base station 200 includes a transmit and receive antenna 210, a receiver 220, an uplink observer 230, an uplink measurement value sender 240, an uplink measurement value collector 250, uplink measurement value summarizers 260, 260a, ..., and a transmitter 270. Note that FIG. 4 only depicts functions relating to handover control while omitting functions for ordinary call control.

The transmit and receive antenna 210 is a radio antenna used for both transmission and reception of signals. The transmit and receive antenna 210 captures uplink signals transmitted by the mobile station 100 and other mobile stations in the cell and supplies the received signals to the receiver 220. The transmit and receive antenna 210 also transmits radio waves of downlink signals that the transmitter 270 produces.

Out of the receive signals supplied from the transmit and receive antenna 210, the receiver 220 extracts signals of individual mobile stations and subjects them to demodulation and decoding. The receiver 220 then supplies the demodulated and decoded data to the uplink observer 230.

The uplink observer 230 extracts control data out of the data supplied from the receiver 220. The control data indicates the condition of radio waves transmitted from a mobile station, such as the number of usable antennas and transmit power of that source mobile station. The uplink observer 230 also extracts a pilot signal and measures the condition (e.g., uplink propagation loss and uplink SIR) of the uplink communication path by observing the extracted pilot signal. The uplink observer 230 provides the obtained information as uplink measurement data. Specifically, for mobile stations currently connected to the base station 200, the uplink observer 230 outputs their measurement data to the uplink measurement value summarizers associated with them. For mobile stations currently connected to other base stations 200a, 200b, and 200c, the uplink observer 230 outputs their measurement data to the uplink measurement value sender 240.

The uplink measurement value sender 240 transfers the uplink measurement data from the uplink observer 230 to relevant base stations via the network 10. Specifically, the uplink measurement value sender 240 forwards measurement data to the base station 200a when that data is of a mobile station currently connected to the base station 200a. The uplink measurement value sender 240 forwards measurement data to the base station 200b when that data is of a mobile station currently connected to the base station 200b. Likewise, the uplink measurement value sender 240 forwards measurement data to the base station 200c when that data is of a mobile station currently connected to the base station 200c.

As to the mobile stations currently connected to the base station 200, the uplink measurement value collector 250 collects uplink measurement data of those mobile stations from other base stations 200a, 200b, and 200c via the network 10. The uplink measurement value collector 250 outputs the collected measurement data of such mobile stations to their associated uplink measurement value summarizers.

The uplink measurement value summarizers 260, 260a, . . . summarize the uplink measurement data collected from the uplink observer 230 and uplink measurement value collector 250 on an individual base station basis, and hold the summarized data for some time. Here the uplink measurement value summarizers 260, 260a, . . . are each responsible for one particular mobile station. For example, the uplink measurement value summarizer 260 is responsible for the mobile station 100. The base station 200 contains as many uplink measurement value summarizers as the number of mobile stations that the base station 200 can serve.

The transmitter 270 performs coding and modulation of packet data, control data, and pilot signals produced in the base station 200. The transmitter 270 outputs the resulting downlink signals to the transmit and receive antenna 210.

In addition to the above, the transmitter 270 may receive a request for uplink measurement data from a mobile station that is currently connected to the base station 200. In response to this request, the transmitter 270 obtains measurement data from the uplink measurement value summarizer associated with the requesting mobile station. The transmitter 270 may also receive a handover request from a mobile station that is currently connected to the base station 200. If this is the case, the transmitter 270 performs a handover process in cooperation with the base stations 200a, 200b, and 200c and other relevant entities.

As can be seen from the above explanation, the first embodiment offers a mobile station 100 configured to produce and hold downlink measurement data, as well as to collect uplink measurement data via the currently connected base station. The mobile station 100 also collects characteristics data from a communication management server 300. Based on the measurement data and characteristics data, the mobile station 100 determines which base station is suitable as a target of handover.

FIG. 5 illustrates a data structure of a measurement value table. The HO management memory 170 in the mobile station 100 stores measurement value tables corresponding to individual base stations 200, 200a, 200b, and 200c. What is illustrated in FIG. 5 is a measurement value table 171 for the base station 200. This measurement value table 171 is formed from data fields of Indicator Name, Uplink Value, and Downlink Value, where the field values arranged in the horizontal direction are associated with each other.

The indicator name field contains the name of each indicator representing communication quality of uplink and downlink. Such indicators may include propagation loss, SIR, propagation delay, and the number of effective antennas. The uplink value field contains indicator values of uplink. The downlink value field contains indicator values of downlink. The units used to represent those uplink and downlink values may differ from one indicator to another.

Measurement data stored in the measurement value table 171 is updated by the station evaluator 160 in the mobile station 100 as occasion demands. For example, the station evaluator 160 enters a record that gives an indicator name of "Propagation Loss," an uplink value of "90.1 dB," and a downlink value of "90.2 dB."

FIG. 6 illustrates a data structure of a characteristic value table. The HO management memory 170 in the mobile station 100 stores characteristic value tables corresponding to individual communications systems. What is illustrated in FIG. 6 is a characteristic value table 172 of system A. This characteristic value table 172 is formed from the data fields of Indicator Name, Uplink Value, and Downlink Value, where the field values arranged in the horizontal direction are associated with each other.

The indicator name field contains the name of each indicator representing system characteristics. Such indicators may include quality of service (QoS), throughput, packet fee, and standby power consumption. The uplink value field contains indicator values of uplink. The downlink value field contains indicator values of downlink. Some indicators do not require distinctions between uplink and downlink. For such indicators, the uplink value field and downlink value field share a single indicator value. The units used to represent uplink and downlink values may differ from one indicator to another.

Characteristics data stored in the characteristic value table 172 is updated by the station evaluator 160 in the mobile station 100 as occasion demands. For example, the station evaluator 160 enters a record that gives an indicator name of "QoS," an uplink value of "10.5 us," and a downlink value of "12.4 us." QoS is an indicator of end-to-end guaranteed maximum delay in the communications system. Uplink and downlink may have quite different QoS values because of the difference in their radio resources allocated by the base stations.

FIG. 7 illustrates a data structure of a base station table according to the first embodiment. The base station table 173 illustrated in FIG. 7 is stored in the HO management memory 170 of the mobile station 100. This base station table 173 is formed from data fields of Type, System Name, and Base Station Name, where the field values arranged in the horizontal direction are associated with each other.

The type field indicates what criteria are applied to evaluate each listed base station. Specifically, the type field takes a value of "Standby," "Uplink," or "Downlink." "Standby" denotes being optimal for standby. "Uplink" denotes being optimal for uplink communication. "Downlink" denotes being optimal for downlink communication. The system name field contains the name of a communications system serving the listed base station, which has been determined to be optimal. The base station name field contains the name of the listed base station, which has been determined to be optimal.

The base station data stored in the base station table 173 is updated by the station evaluator 160 in the mobile station 100 as occasion demands. For example, the base station table 173 is populated with the following entries. That is, one entry indicates that stational of system A is optimal for standby. Another entry indicates that station b1 of system B is optimal for uplink communication. Yet another entry indicates that station a2 of system A is optimal for downlink communication.

While the base station table 173 of FIG. 7 includes it, the system name field may be omitted in the case where it is possible to uniquely identify a communication system by using a given base station name. Also, while the base station table 173 illustrated in FIG. 7 enumerates optimal base stations for every type, one type may be omitted if the criteria for that type are identical to some other type's. For example, in the case where the same criteria apply to both standby and downlink, the base station table 173 may omit the record indicating optimal base station for standby.

The following section will give details of what are executed in a communications system having the above-described elements and data structures.

Figure 8:
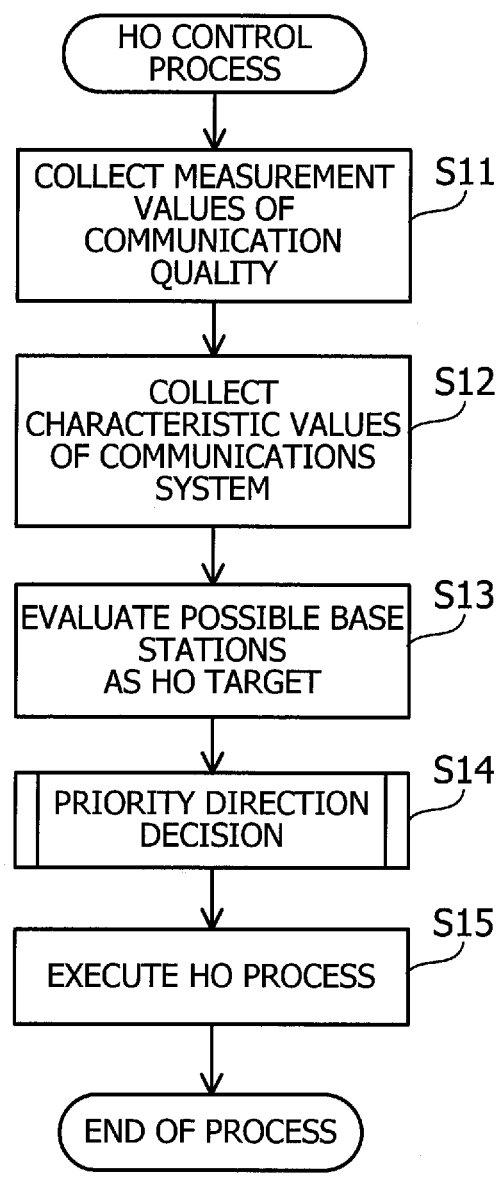
FIG. 8 is a flowchart illustrating an HO control process according to the first embodiment.

FIG. 8 is a flowchart illustrating an HO control process according to the first embodiment. Each processing step of FIG. 8 will be described below in the order of step numbers indicated therein, assuming that the mobile station 100 is currently connected to the base station 200.

[Step S11] The mobile station 100 produces downlink measurement data based on signals received from the base stations 200, 200a, 200b, and 200c. The mobile station 100 also collects, via the base station 200, uplink measurement data produced by the base stations 200, 200a, 200b, and 200c.

[Step S12] The mobile station 100 collects characteristics data of system A and system B via the base station 200. This characteristics data is under the management of the communication management server 300.

[Step S13] Based on the measurement data collected at step S11 and characteristics data collected at step S12, the mobile station 100 determines candidates for the target base station for handover. That is, the mobile station 100 determines which base station is optimal for uplink communication, as well as which base station is optimal for downlink communication. For this evaluation, the mobile station 100 may consult both the measurement data and characteristics data or only one of the two.

[Step S14] The mobile station 100 identifies which data service the mobile station 100 uses. According to the identified data service, the mobile station 100 determines which communication direction is of priority. Details of this determination will be described later.

[Step S15] The mobile station 100 selects a target base station for handover from among the candidate base stations determined at step S13, by picking the one that is optimal for the communication direction determined at step S14. Then the mobile station 100 executes handover from its currently connected base station to the newly selected base station.

As can be seen from the above, the mobile station 100 determines optimal base stations individually for uplink and downlink, based on the communication quality between itself and each base station, as well as on the system characteristics of each communications system. The mobile station 100 then determines which direction has priority according to what data service is used and selects a base station optimal for that direction as a target base station for handover.

Which communication direction is selected as a priority direction depends on the class of data services. Uplink will be the priority direction in the case of data services that primarily use uplink communication. This class of data service includes email message transmission and file upload. On the other hand, downlink will be the priority direction in the case of data services that primarily use downlink communication. This class of data service includes viewing of broadcast programs, file download, and browsing of web documents.

Some data services require both uplink and downlink for bidirectional communication. For those data services, the mobile station 100 determines their priority direction based on, for example, how much throughput is needed to provide them. This class of data service includes Voice over Internet Protocol (VoIP) calls and online games.

Figure 9:
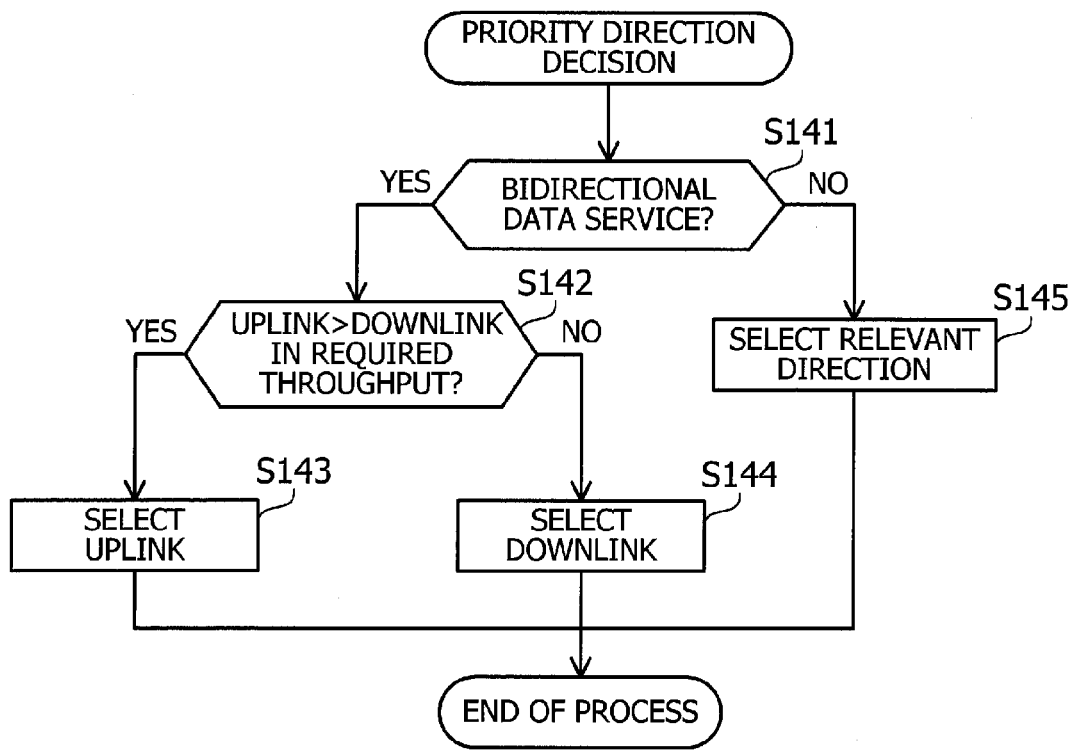
FIG. 9 is a flowchart illustrating a priority direction decision process.

FIG. 9 is a flowchart illustrating another version of the priority direction decision process. Each processing step of FIG. 9 will be described below in the order of step numbers indicated therein.

[Step S141] The mobile station 100 determines whether the data service used requires bidirectional communication. If bidirectional communication is required, then the process advances to step S142. If bidirectional communication is not required, then the process advances to step S145.

[Step S142] The mobile station 100 determines uplink throughput and downlink throughput that the data service requires. The mobile station 100 then determines whether the required uplink throughput is greater than the required downlink throughput. If the uplink has a greater requirement, the process advances to step S143. If not, the process advances to step S144.

[Step S143] The mobile station 100 selects uplink as the priority direction.

[Step S144] The mobile station 100 selects downlink as the priority direction.

[Step S145] The mobile station 100 selects a priority direction by determining which link direction the data service uses primarily.

For example, VoIP calls usually require equal throughput for uplink and downlink. Accordingly, the mobile station 100 using a VoIP service selects downlink as the priority direction. On the other hand, the throughput requirements of online games may vary depending on what genre of the games are. The mobile station 100 using an online game service thus selects a priority direction according to the genre of that game.

In determining the priority direction, the mobile station 100 may take into consideration the amount of remaining battery power in addition to the class of data services used. In this case, the decision method of FIG. 9 is modified as will be discussed below.

Figure 10:
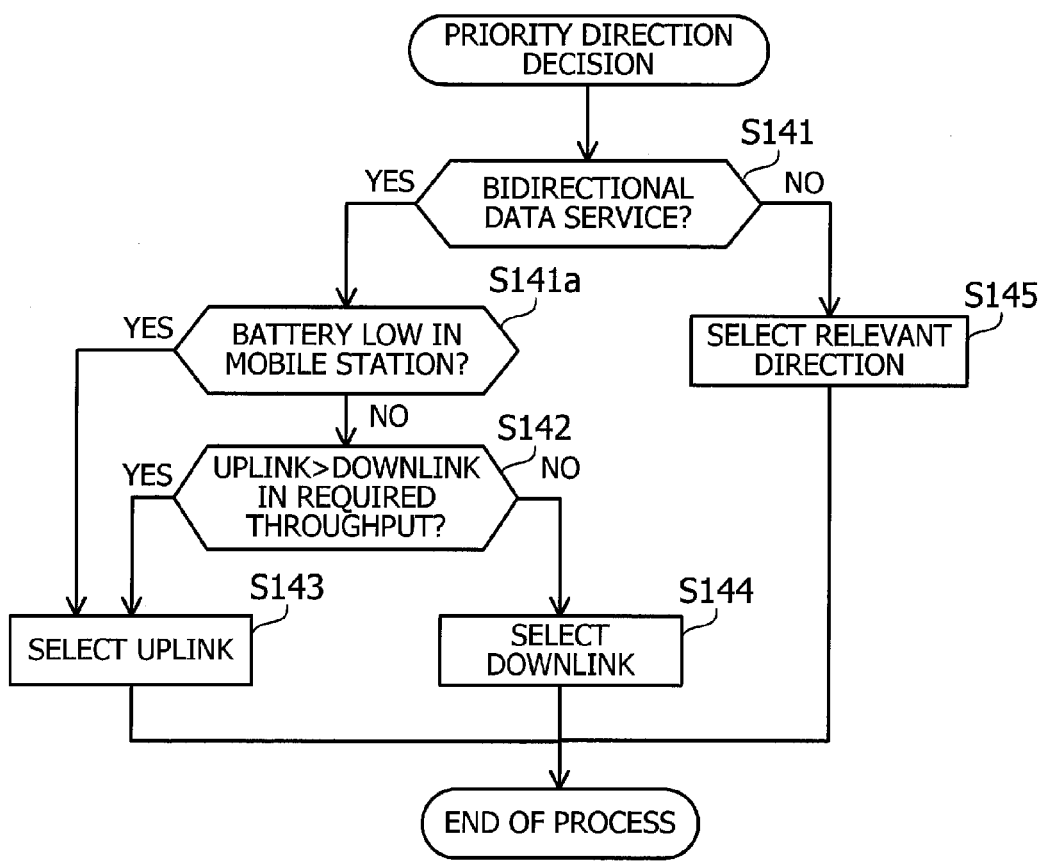
FIG. 10 is a flowchart illustrating another version of the priority direction decision process.

FIG. 10 is a flowchart illustrating another version of the priority direction decision process. According to the priority direction decision process of FIG. 10, the following step S141a is executed between step S141 and step S142 of FIG. 9.

[Step S141a] The mobile station 100 determines whether the currently remaining battery power is lower than a predetermined threshold. If the remaining battery power is found to be low, the process advances to step S143. If the remaining battery power is not low, the process advances to step S142.

In operation of the method illustrated in FIG. 10, the mobile station 100 determines whether the remaining battery power is lower than a predetermined threshold, after it is determined that bidirectional communication is required in the data service used. In the case where the remaining battery power is found to be low, the mobile station 100 selects uplink as the priority direction, without checking requirements for uplink throughput and downlink throughput. In the case where there remains a sufficient amount of battery power, the mobile station 100 selects either uplink or downlink according to the throughput requirements. The reason why the mobile station 100 in low-battery condition prefers uplink to downlink is that the mobile station 100 consumes more power in transmitting uplink signals when the uplink communication quality is bad.

The following section will now provide a more specific example of how to select an optimal target base station for handover.

Figure 11:
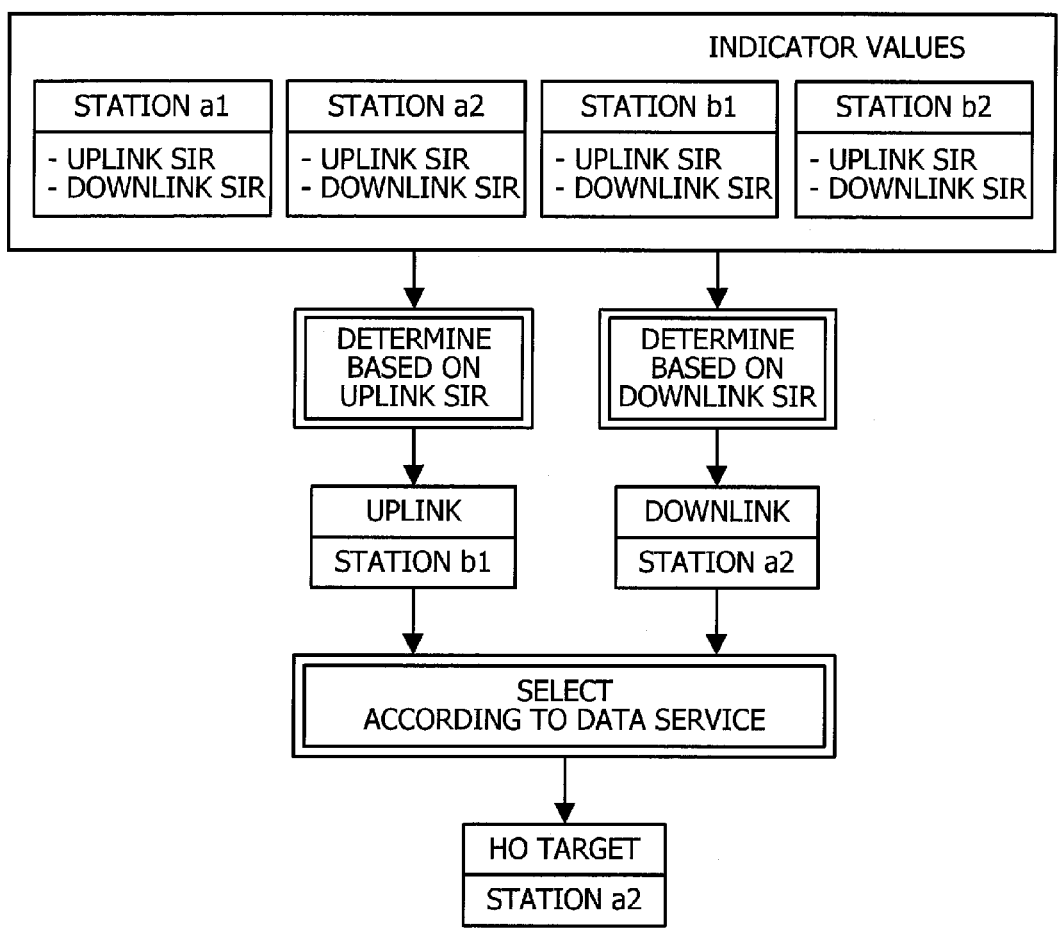
FIG. 11 is a first schematic diagram illustrating a base station selection method according to the first embodiment.

FIG. 11 is a first schematic diagram illustrating a base station selection method according to the first embodiment. This base station selection method of FIG. 11 uses a single kind of indicator in determining which base station is optimal for uplink, as well as which base station is optimal for downlink. In a subsequent handover operation, the method selects one of the two base stations determined as being optimal. The method illustrated in FIG. 11 uses SIR as the above-noted indicator.

Specifically, one of the base stations a1, a2, b1, and b2 that gives the best uplink SIR is designated as an optimal station for uplink. Likewise, one of the base stations a1, a2, b1, and b2 that gives the best downlink SIR is designated as an optimal station for downlink. For example, station b1 is designated as an optimal station for uplink, and station a2 is designated as an optimal station for downlink.

Either station b1 or station a2 is selected afterwards according to the class of data services that the mobile station 100 uses. In the case, for example, where the mobile station 100 uses a data service that enables browsing of web documents, station a2 is selected because the downlink has priority in that service.

Figure 12:
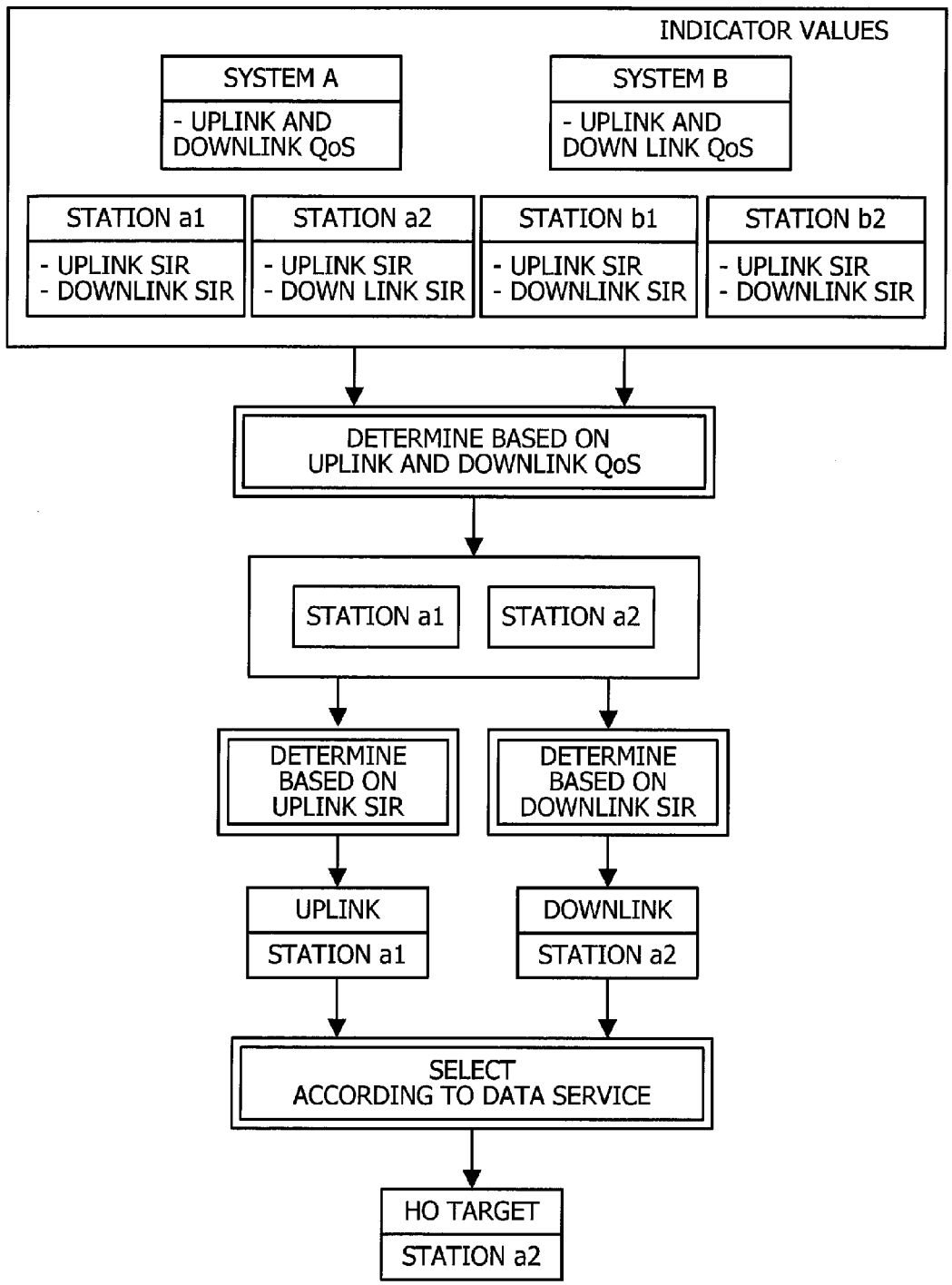
FIG. 12 is a second schematic diagram illustrating a base station selection method according to the first embodiment.

FIG. 12 is a second schematic diagram illustrating a base station selection method according to the first embodiment. The base station selection method illustrated in FIG. 12 begins with examining an indicator of system characteristics to determine which communications system is optimal. Then, using another indicator representing communication quality, method determines a base station optimal for uplink and a base station optimal for downlink, from among those belonging to the communications system determined to be optimal. In a subsequent handover operation, the method selects one of the two base stations determined to be optimal. FIG. 12 depicts the case where QoS and SIR are used as indicators of system characteristics and communication quality, respectively.

Specifically, it is first determined which of the systems A and B provides the best QoS and is thus eligible to be the optimal communications system. For example, system A is determined to be the optimal communications system. Since QoS may take different values for uplink and downlink, this determination has to calculate their average, or choose a worse one, or use some other measure.

It is then determined which of the stations a1 and a2 belonging to system A provides the best uplink SIR and is thus eligible to be the optimal station for uplink. Likewise, it is determined which of these stations a1 and a2 provides the best downlink SIR and is thus eligible to be the optimal station for downlink. For example, stationa1 is determined to be the optimal station for uplink, and station a2 is determined to be the optimal station for downlink.

Either stationa1 or station a2 is selected afterwards according to the class of data services that the mobile station 100 uses. In the case, for example, where the mobile station 100 uses a data service that enables browsing of web documents, station a2 is selected because the downlink has priority in that service.

Figure 13:
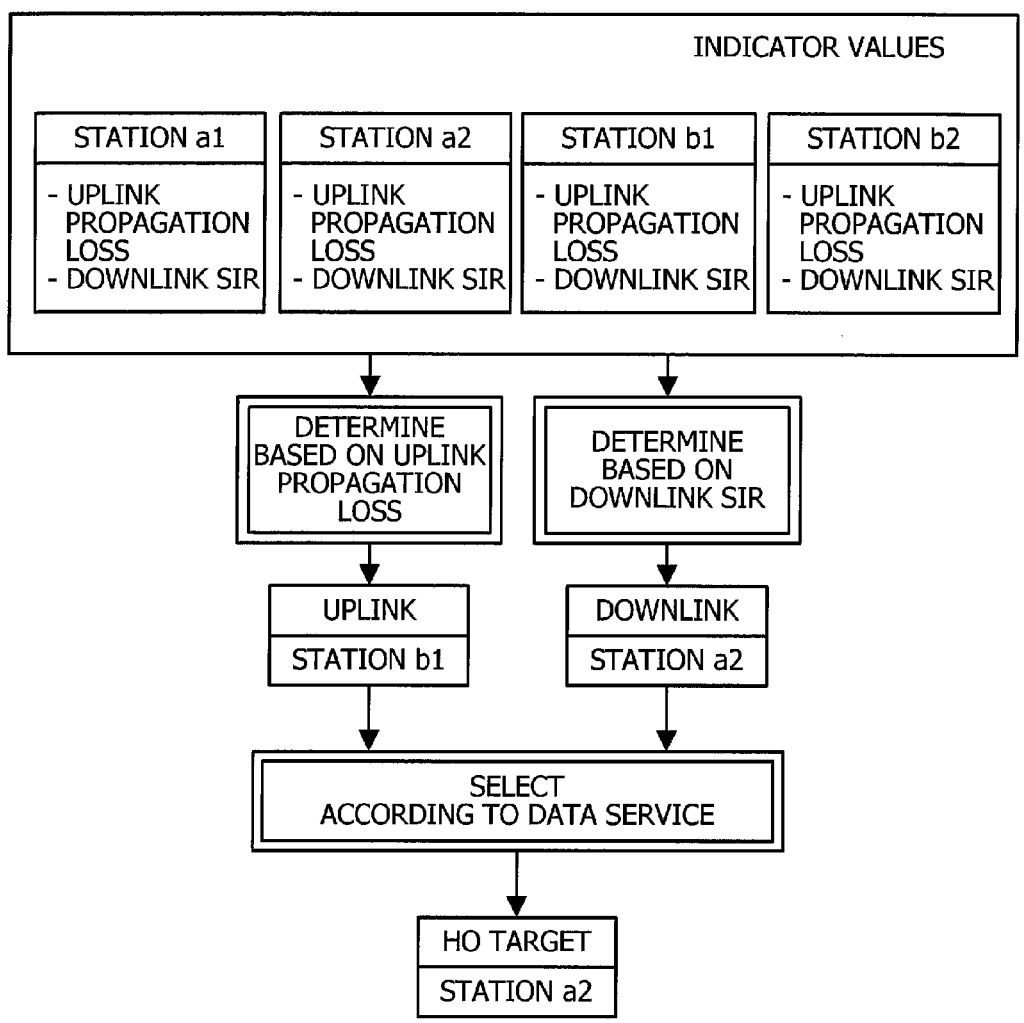
FIG. 13 is a third schematic diagram illustrating a base station selection method according to the first embodiment.

FIG. 13 is a third schematic diagram illustrating a base station selection method according to the first embodiment. The base station selection method of FIG. 13 uses different indicators for uplink and downlink in determining their optimal base stations. In a subsequent handover operation, the method selects one of the two base stations determined as being optimal. FIG. 13 depicts the case where propagation loss is used as an indicator for uplink while SIR is used as an indicator for downlink.

Specifically, one of the base stations a1, a2, b1, and b2 that gives the lowest uplink propagation loss is designated as an optimal station for uplink. For downlink, one of the base stations a1, a2, b1, and b2 that gives the best downlink SIR is designated as an optimal station. For example, station b1 is designated as an optimal station for uplink, and station a2 is designated as an optimal station for downlink.

Either station b1 or station a2 is selected afterwards according to the class of data services that the mobile station 100 uses. In the case, for example, where the mobile station 100 uses a data service that enables browsing of web documents, station a2 is selected because the downlink has priority in that service.

Figure 14:
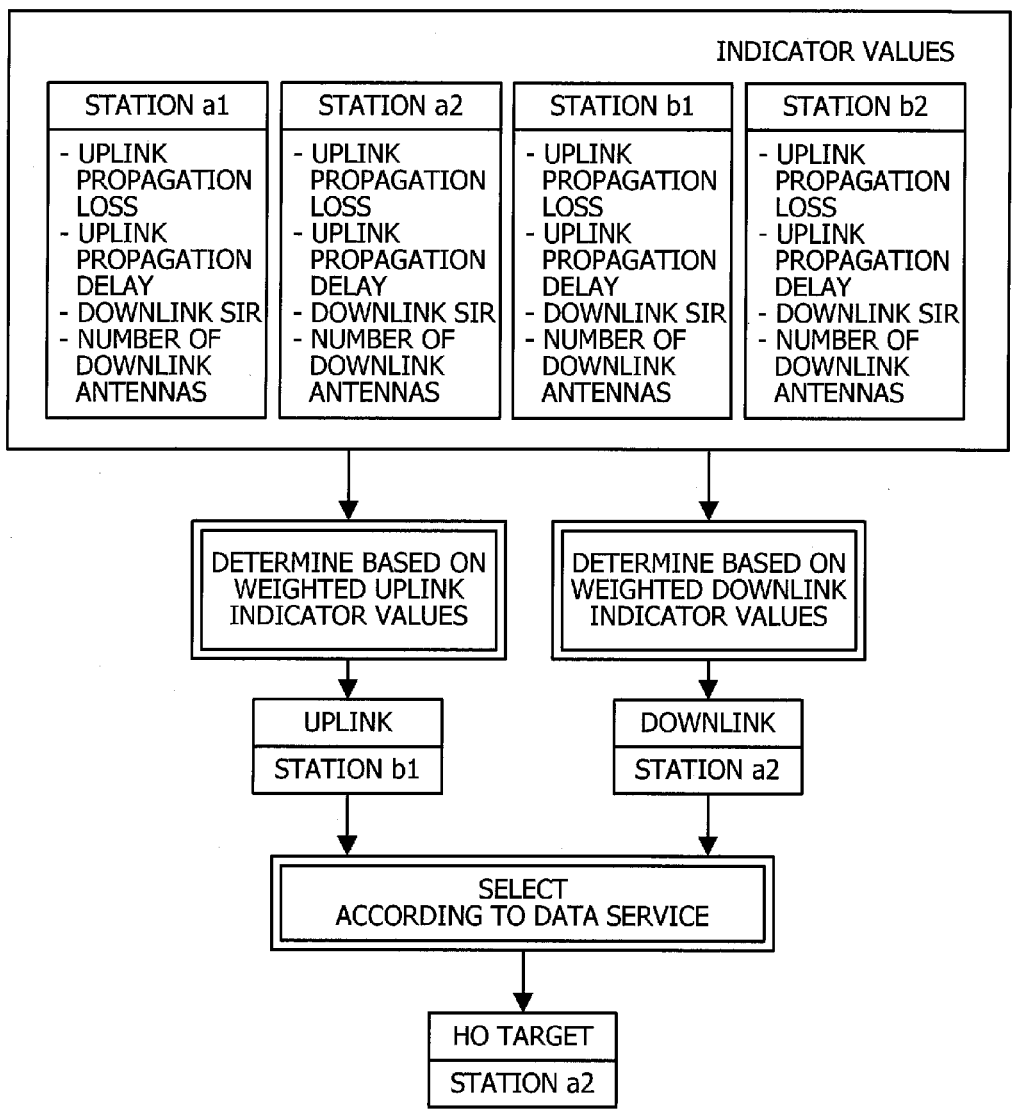
FIG. 14 is a fourth schematic diagram illustrating a base station selection method according to the first embodiment.

FIG. 14 is a fourth schematic diagram illustrating a base station selection method according to the first embodiment. This base station selection method of FIG. 14 uses a different set of indicators for uplink and downlink individually in determining their optimal base stations. In a subsequent handover operation, the method selects one of the two base stations determined as being optimal. FIG. 14 depicts the case where propagation loss and propagation delay are used as indicators of uplink while SIR and the number of antennas are used as indicators of downlink.

Specifically, the indicator values are weighted according to the following formulas to calculate priority levels. The base station with the highest priority level is then designated as an optimal station.

$$\text{(Uplink Priority Level)} = \alpha 1 \times \text{(Uplink Propagation Loss)} + \beta 1 \times \text{(Uplink Propagation Delay)}$$

$$\text{(Downlink Priority Level)} = \alpha 2 \times \text{(Downlink SIR)} + \beta 2 \times \text{(Number of Downlink Antennas)}$$

where $\alpha 1$, $\alpha 2$, $\beta 1$, and $\beta 2$ are predefined weighting factors.

That is, one of the base stations a1, a2, b1, and b2 is designated as an optimal station for uplink when that base station ranks the highest in terms of priority level calculated from uplink propagation loss and uplink propagation delay. Likewise, one of the base stations a1, a2, b1, and b2 is designated as an optimal station for downlink when that base station ranks the highest in terms of priority level calculated from downlink SIR and the number of downlink antennas. For example, station b1 is designated as an optimal station for uplink, and station a2 is designated as an optimal station for downlink.

Either station b1 or station a2 is selected afterwards according to the class of data services that the mobile station 100 uses. In the case, for example, where the mobile station 100 uses a data service that enables browsing of web documents, station a2 is selected because the downlink has priority in that service.

While the methods discussed in FIGS. 11, 13, and 14 use indicators representing communication quality of uplink and downlink, each method may be modified to use indicators representing system characteristics of communications systems. It is also possible to combine the methods discussed in FIGS. 11 to 14.

The following section will now describe a communication flow in a handover operation involving a mobile station 100, base stations 200, 200a, 200b, and 200c, and communication management server 300. It is assumed in the following description that the mobile station 100 is initially in the standby state, and that the base stations 200 and 200a have been designated as an optimal-for-standby station and an optimal-for-communication station, respectively.

Figure 15:
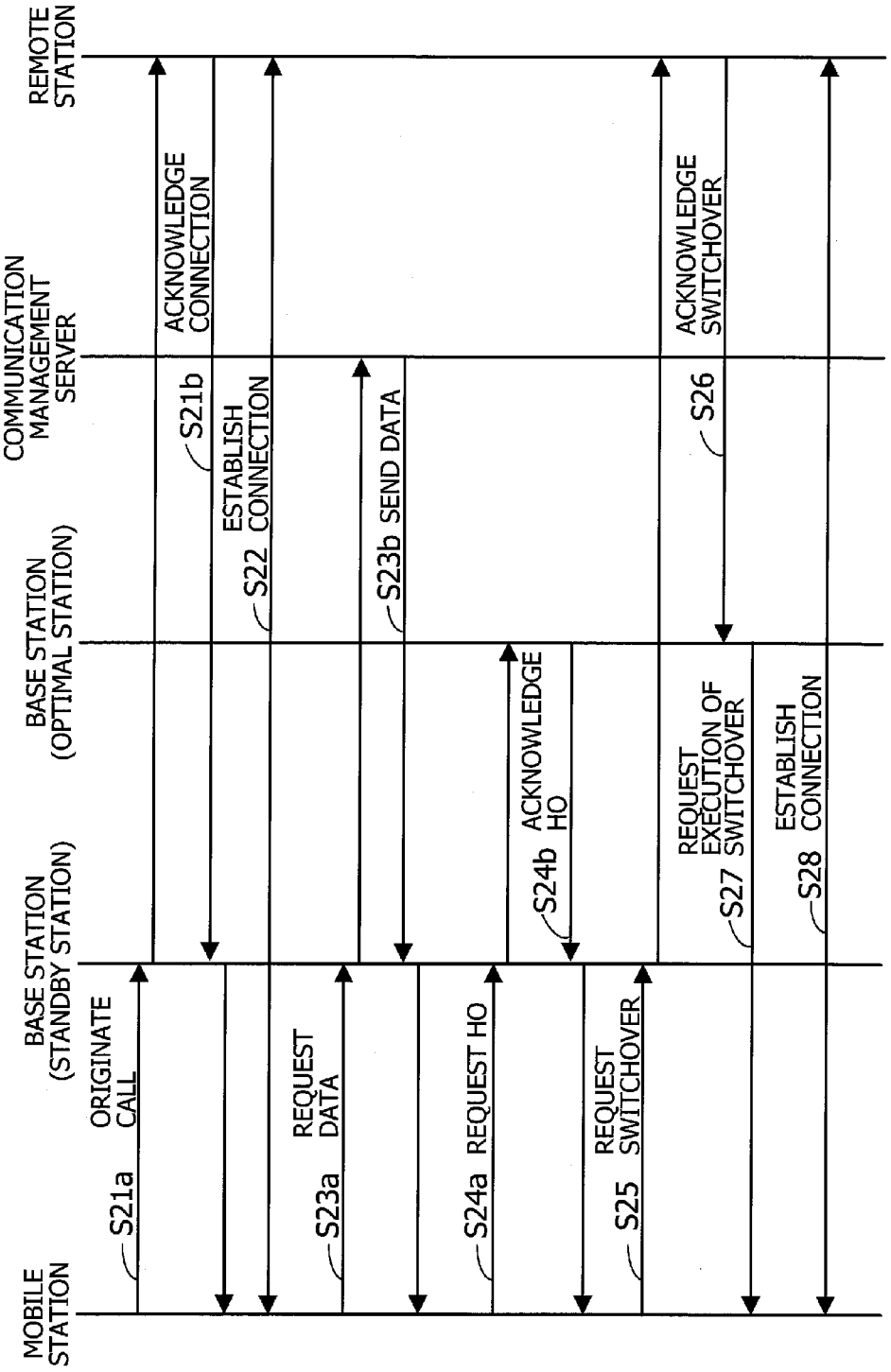
FIG. 15 is a first sequence diagram illustrating a communication flow according to the first embodiment.

FIG. 15 is a first sequence diagram illustrating a communication flow according to the first embodiment. The sequence diagram of FIG. 15 assumes that the mobile station 100 initiates a communication session. Each processing step of FIG. 15 will be described below in the order of step numbers indicated therein.

[Step S21a] The mobile station 100 sends a communication request to the base station 200. Upon receipt of this communication request, the base station 200 sends a connection request to the called remote station via the network 10.

[Step S21b] In response to the connection request at step S21a, the remote station returns an acknowledgment to the base station 200 via the network 10. The base station 200 forwards the acknowledgment to the mobile station 100.

[Step S22] A connection is established between the mobile station 100 and the remote station, where the base station 200 acts as a relay point of their communication.

[Step S23a] The mobile station 100 requests the base station 200 to provide characteristics data. The base station 200 forwards this request to the communication management server 300 via the network 10.

[Step S23b] In response to the request issued at step S23a, the communication management server 300 transmits characteristics data of each communications system to the base station 200. The base station 200 forwards this characteristics data from the communication management server 300 to the mobile station 100.

[Step S24a] According to the data service used, the mobile station 100 selects a target base station (base station 200a) for handover. The mobile station 100 sends a handover request to the base station 200. The base station 200 sends the handover request to the base station 200a.

[Step S24b] In response to the handover request at step S24a, the base station 200a returns an acknowledgment to the base station 200. The base station 200 informs the mobile station 100 of the acknowledgment, which brings the mobile station 100 into a state of being ready to switch its connection.

[Step S25] The mobile station 100 sends a switchover request to the base station 200 to initiate switchover between base stations. The base station 200 forwards this switchover request to the remote station via the network 10.

[Step S26] In response to the switchover request at step S25, the remote station returns a completion notice to the base station 200a via the network 10.

[Step S27] The base station 200a requests the mobile station 100 to switch its connection. Accordingly, the mobile station 100 switches its connection from the base station 200 to the base station 200a.

[Step S28] A connection is established between the mobile station 100 and the remote station, where the base station 200a now acts as a relay point of their communication.

As can be seen from the above, the mobile station 100 establishes a connection with a remote station by using first the optimal-for-standby station. When the need for handover arises, the mobile station 100 sends a handover request to the optimal-for-communication station via the optimal-for-standby station. The mobile station 100 then switches its connection upon receipt of an acknowledgment from the remote station. While FIG. 15 illustrates a case where the mobile station 100 collects characteristics data upon origination of a call, the mobile station 100 may skip that step if it has collected such data recently. In that case, the mobile station 100 uses the latest characteristics data collected before the call origination, instead of collecting another set of characteristics data.

Figure 16:
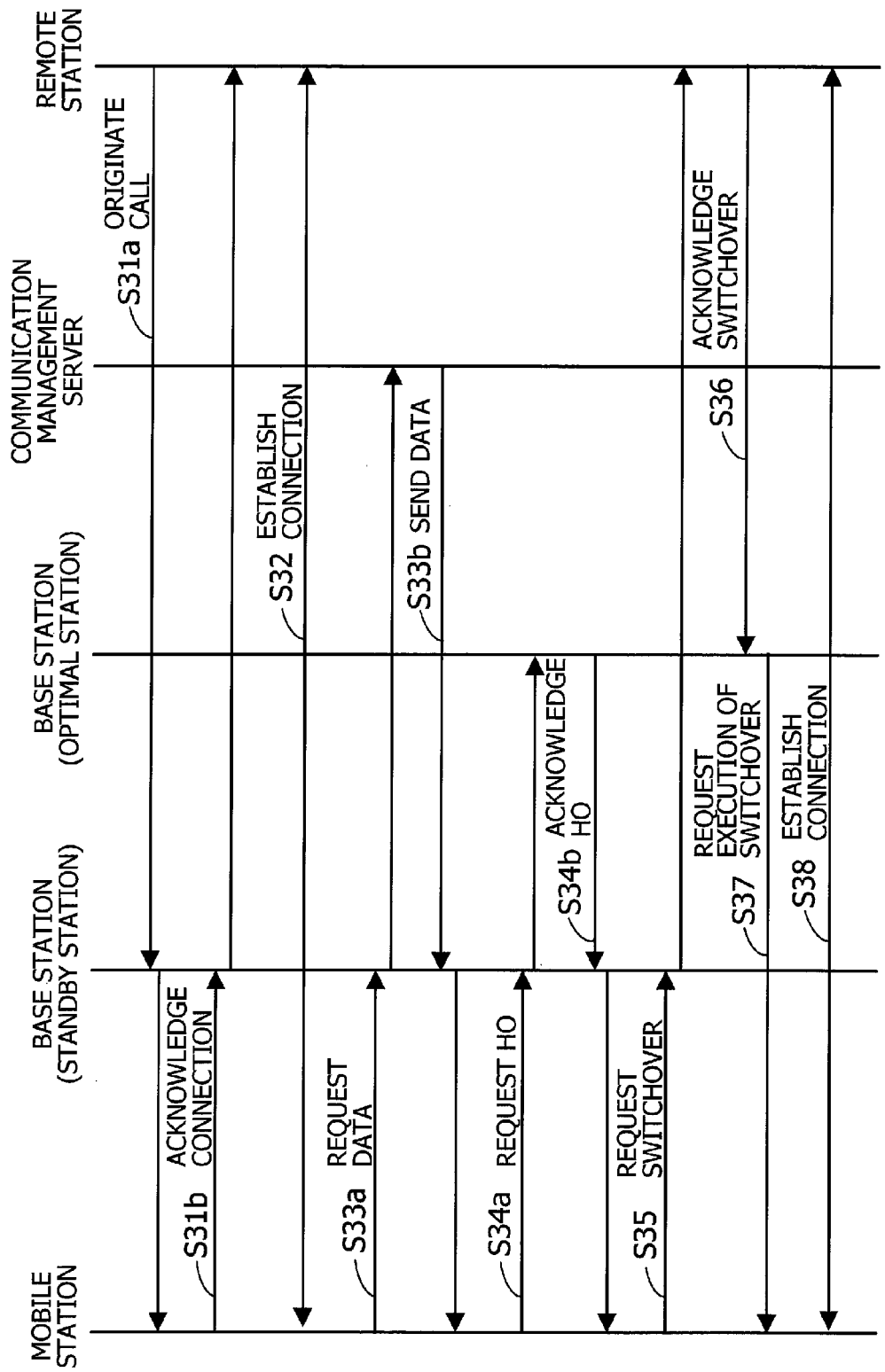
FIG. 16 is a second sequence diagram illustrating a communication flow according to the first embodiment.

FIG. 16 is a second sequence diagram illustrating a communication flow according to the first embodiment. The sequence diagram of FIG. 16 assumes that a remote station initiates a communication session with the mobile station 100. While the sequence of FIG. 16 includes steps S31a to S38, the following description will not discuss steps S33a to S38 because of their similarity to steps S23a to S28 explained in FIG. 15. Steps S31a to S32 will now be described below according to the order of step numbers.

[Step S31a] The remote station sends a connection request to the base station 200 via the network 10. Upon receipt of this connection request, the base station 200 sends a connection request to the mobile station 100.

[Step S31b] In response to the connection request at step S31a, the mobile station 100 returns an acknowledgment to the base station 200. The base station 200 informs the remote station of the acknowledgment.

[Step S32] A connection is established between the mobile station 100 and the remote station, where the base station 200 acts as a relay point of their communication.

As can be seen from the above, the remote station establishes a connection with the mobile station 100 by using first the optimal-for-standby station. When the need for handover arises, the mobile station 100 sends a handover request to the optimal-for-communication station via the optimal-for-standby station. The mobile station 100 then switches its connection upon receipt of an acknowledgment from the remote station.

According to the above-described communications system, the mobile station 100 collects measurement data indicating the current communication quality, as well as characteristics data indicating system characteristics of each communications system. The mobile station 100 then selects an optimal target base station according to the class of data services that it uses. This feature enables more efficient use of radio resources, as well as contributing to further reduction of power consumption. The above technique also makes it easier to realize handover across different communications systems.

Second Embodiment

A second embodiment will now be described in detail below with reference to the accompanying drawings. The following description will focus on its difference from the foregoing first embodiment, thus omitting explanation of similar elements. The second embodiment provides a communications system which not only classifies optimal base stations into "Standby," "Uplink," and "Downlink," but also evaluates them on more detailed criteria.

The system arrangement discussed in FIG. 2 for the first embodiment can similarly be used to realize a communications system according to the second embodiment. Also, the module arrangement illustrated in FIGS. 3 and 4 for the mobile station 100 and base station 200 of the first embodiment can similarly be used to realize mobile stations and base stations according to the second embodiment. The second embodiment differs from the first embodiment in how to determine candidates for the target base station for handover. The following section will describe the second embodiment, using the same reference numerals as those in the first embodiment to refer to mobile stations and base stations.

FIG. 17 illustrates a data structure of a base station table according to the second embodiment. The base station table 174 of FIG. 17 is stored in an HO management memory 170 of a mobile station 100, as an alternative to the base station table 173 according to the first embodiment discussed in FIG. 7. This base station table 174 is formed from the data fields of Service Name, Type, System Name, and Base Station Name, where the field values arranged in the horizontal direction are associated with each other.

The service name field contains a class name of data services, which takes a value of "Web," "Movie," or the like. "Web" denotes being optimal for transmission and reception of web documents. "Movie" denotes being optimal for transmission and reception of videos. The type, system name, and base station name fields serve the same purposes as their counterparts in the base station table 173 discussed in the first embodiment.

The base station data stored in the base station table 174 is updated by the station evaluator 160 in the mobile station 100 as occasion demands. For example, the base station table 174 is populated with an entry indicating that station b1 of system B is optimal for uplink transmission of web documents, and an entry indicating that station a2 of system A is optimal for downlink reception of web documents.

Figure 18:
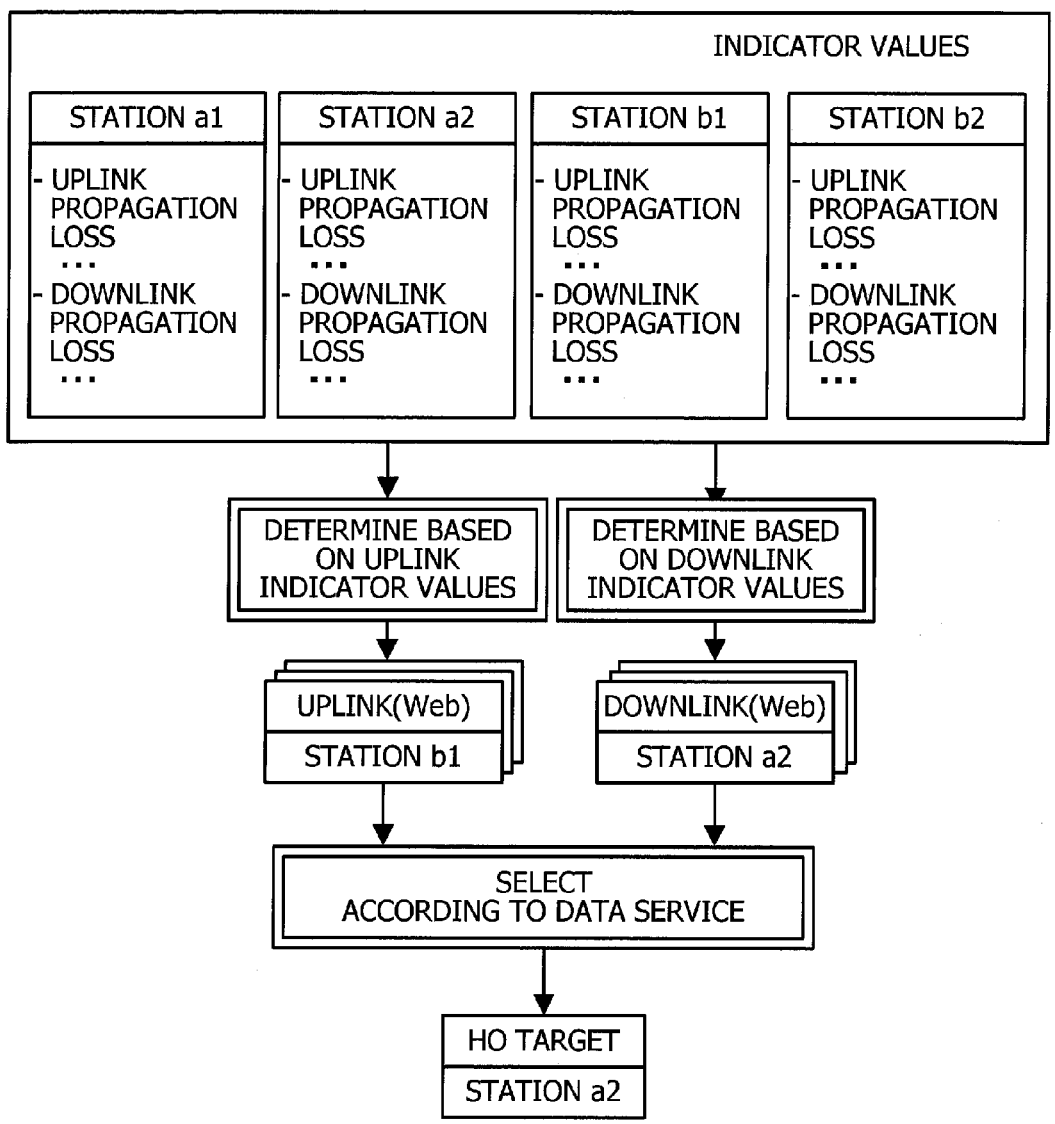
FIG. 18 is a schematic diagram illustrating a base station selection method according to the second embodiment.

FIG. 18 is a schematic diagram illustrating a base station selection method according to the second embodiment. The base station selection method of FIG. 18 uses different indicators for different data service classes in determining which base station is optimal for uplink and which base station is optimal for downlink. Afterwards, the target base station for handover is determined based on the class and priority direction of the data service that the mobile station 100 uses.

Specifically, a particular indicator has significance in the transmission of web documents, and one of the base stations a1, a2, b1, and b2 that gives the best value in that indicator is designated as an optimal station for uplink of "Web" class. Likewise, a particular indicator has significance in the reception of web documents, and one of the base stations a1, a2, b1, and b2 that gives the best value in that indicator is designated as an optimal station for downlink of "Web" class. The same applies to other data services. For example, station b1 is designated as an optimal station for uplink of "Web" class, and station a2 is designated as an optimal station for downlink of "Web" class.

One of those base stations is selected afterwards according to the class of data services that the mobile station 100 uses. In the case, for example, where the mobile station 100 uses a data service that enables browsing of web documents, station a2 is selected because it has been designated as the optimal station of downlink of "Web" class.

As described in the first embodiment, the determination method may use system characteristics of each communications system. The determination method may also use different indicators for uplink and downlink. Further, the determination method may use a plurality of weighted indicators. It is possible to combine these variations into the second embodiment.

The above-described communications system offers the same advantages as the communications system according to the first embodiment. The communications system according to the second embodiment further enables more precise determination of optimal base stations.

Third Embodiment

A third embodiment will now be described in detail below with reference to the accompanying drawings. The following description will focus on its difference from the foregoing first embodiment, thus omitting explanation of similar elements. According to the third embodiment, optimal stations for uplink and downlink are previously determined for each individual communications system so as to permit selection of an optimal communication system at the time of handover.

The system arrangement discussed in FIG. 2 for the first embodiment can similarly be used to realize a communications system according to the third embodiment. Also, the module arrangement illustrated in FIGS. 3 and 4 for the mobile station 100 and base station 200 of the first embodiment can similarly be used to realize mobile stations and base stations according to the third embodiment. The third embodiment differs from the first embodiment in how to determine candidates for the target base station for handover. The following section will describe the third embodiment, using the same reference numerals as those in the first embodiment to refer to mobile stations and base stations.

FIG. 19 illustrates an example data structure of an indicator axis table. The indicator axis table 175 illustrated in FIG. 19 is stored in an HO management memory 170 of the mobile station 100. This indicator axis table 175 is formed from data fields of Service Name and Indicator Name, where the field values arranged in the horizontal direction are associated with each other.

The service name field contains a class name of data services, such as "Mail (Send)" and "Web (Receive)" to name a few. The indicator name field contains the name of an indicator used to select communications systems, such as "QoS (Uplink)" and "Standby Power Consumption."

The indicator axis table 175 is registered in advance in the mobile station 100. For example, a table entry giving a service name of "Mail (Send)" and an indicator name of "QoS (Uplink)" is registered. This entry means that the mobile station 100 is supposed to select an optimal communications system based on the uplink QoS when sending an email message. Another example table entry gives a service name of "Mail (Receive)" and an indicator name of "<Maintain>." This entry means that the mobile station 100 is supposed to select a communications system to which the currently connected base station belongs, when receiving email messages. In other words, the handover will not go beyond the boundary of the current communications system.

FIG. 20 illustrates a structure of a base station table according to the third embodiment. The base station table 176 of FIG. 20 is stored in the HO management memory 170 of the mobile station 100, as an alternative to the base station table 173 of the first embodiment discussed in FIG. 7. This base station table 176 is formed from data fields of Type, System Name, and Base Station Name, where the field values arranged in the horizontal direction are associated with each other.

The type, system name, and base station name fields serve the same purposes as their counterparts in the base station table 173 discussed in the first embodiment. The difference is that the type values other than "Standby" are associated with information that indicates optimal base stations for individual communications systems. More specifically, the base station table 176 defines an optimal base station for each of the uplink of system A, downlink of system A, uplink of system B, and downlink of system B.

The base station data stored in the base station table 176 is updated by the station evaluator 160 in the mobile station 100 as occasion demands. For example, the base station table 176 is populated with an entry indicating that station a1 is optimal for uplink communication using system A, and an entry indicating that station b1 is optimal for downlink communication using system B.

Figure 21:
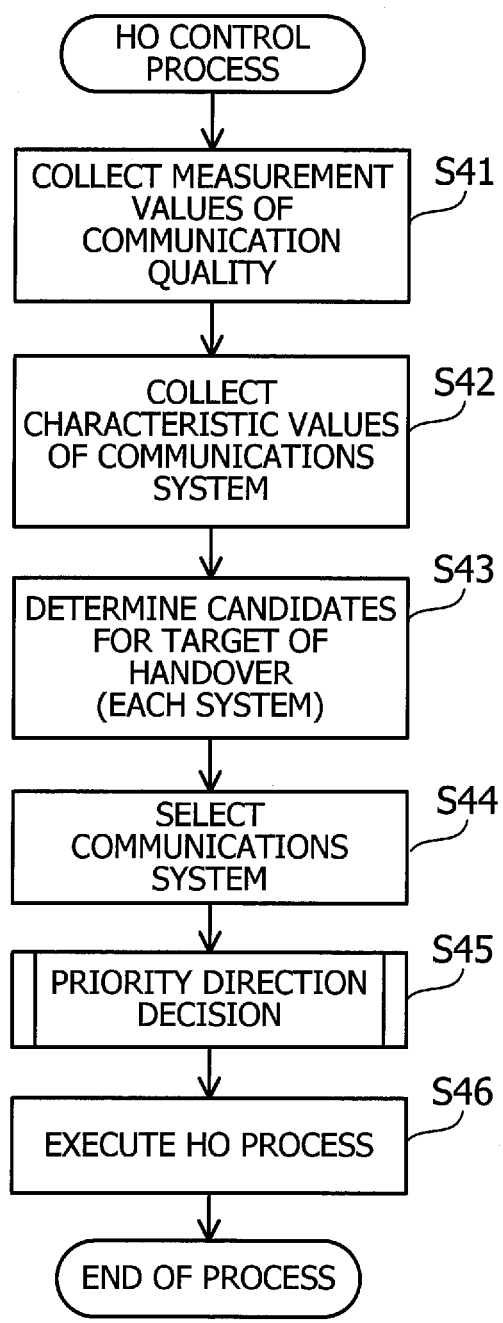
FIG. 21 is a flowchart illustrating an HO control process according to the third embodiment.

FIG. 21 is a flowchart illustrating an HO control process according to the third embodiment. Each processing step of FIG. 21 will be described below in the order of step numbers indicated therein, assuming that the mobile station 100 is currently connected to the base station 200.

[Step S41] The mobile station 100 produces downlink measurement data based on signals received from the base stations 200, 200a, 200b, and 200c. The mobile station 100 also collects, via the base station 200, uplink measurement data produced by the base stations 200, 200a, 200b, and 200c.

[Step S42] The mobile station 100 collects characteristics data of system A and system B via the base station 200. This characteristics data is under the management of the communication management server 300.

[Step S43] Based on the measurement data collected at step S41 and characteristics data collected at step S42, the mobile station 100 determines candidates for the target base station for handover. That is, the mobile station 100 determines which base station is optimal for uplink communication, as well as which base station is optimal for downlink communication, individually for each of the systems A and B. For this evaluation, the mobile station 100 may consult both the measurement data and characteristics data or only one of the two.

[Step S44] The mobile station 100 identifies which data service the mobile station 100 uses. Then the mobile station 100 selects an optimal communications system based on the identified data service and the characteristics data collected at step S42.

[Step S45] The mobile station 100 determines a priority direction of communication based on the data service identified at step S44. The method discussed in the first embodiment may be used here to determine the priority direction.

[Step S46] The mobile station 100 now selects a target base station for handover from among the candidate base stations determined at step S43 by picking the one that is optimal for both the communications system selected at step S44 and the communication direction determined at step S45. Then the mobile station 100 executes handover from its currently connected base station to the newly selected base station.

As can be seen from the above, the mobile station 100 determines optimal base stations for uplink and downlink of individual communications systems, based on the communication quality between itself and each base station and the system characteristics of each communications system. The mobile station 100 then determines which communications system is optimal for the data service used, as well as which direction has priority in that data service, and selects an optimal target base station for handover accordingly.

At the above step S44, the mobile station 100 may be configured to automatically choose a communications system to which the currently connected base station belongs, instead of consulting system characteristics to choose a base station. In other words, it is possible to restrict handover, not to go beyond the boundary of the current communications system.

The following section will now provide a more specific example of how to select an optimal target base station for handover.

Figure 22:
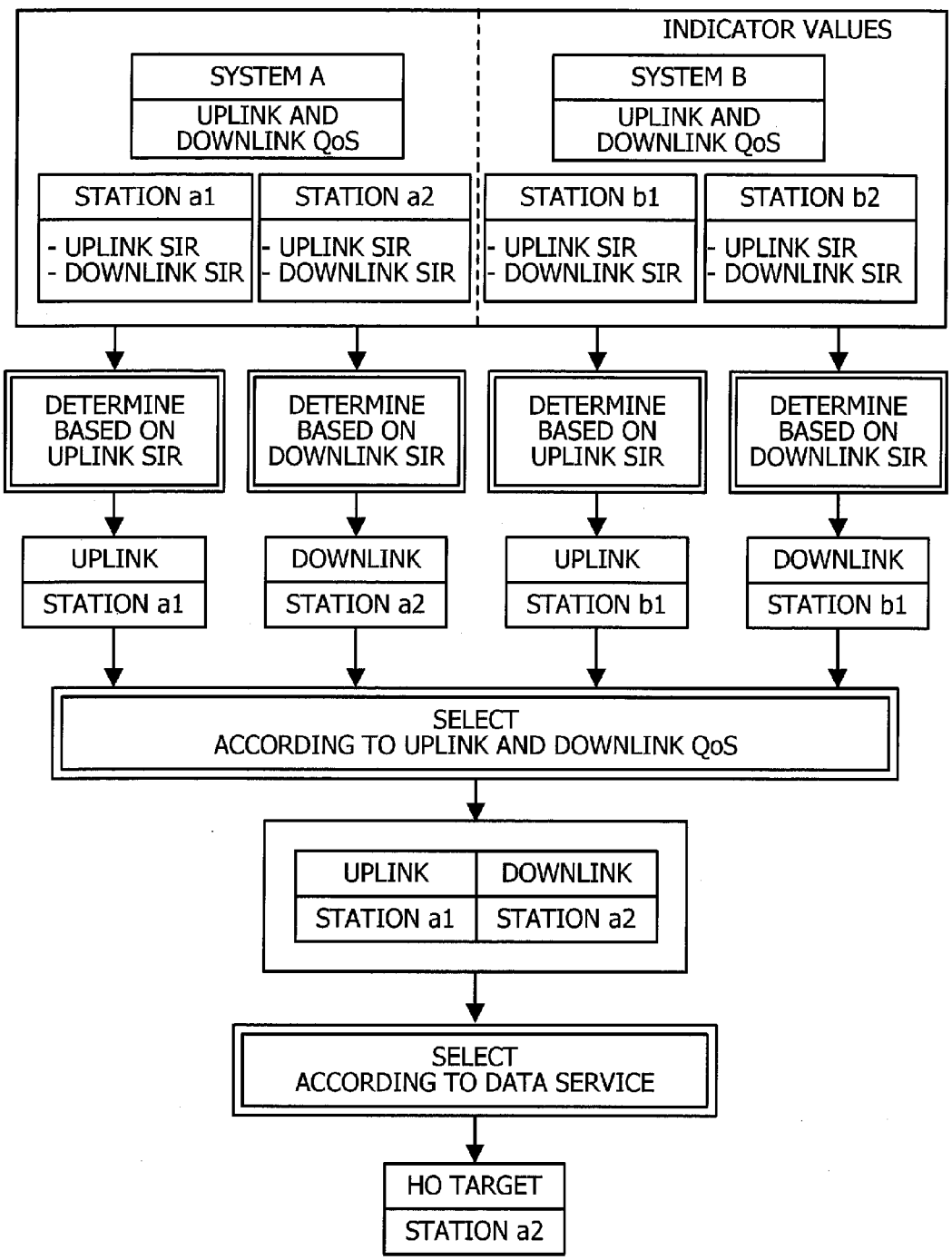
FIG. 22 is a first schematic diagram illustrating a base station selection method according to the third embodiment.

FIG. 22 is a first schematic diagram illustrating a base station selection method according to the third embodiment. This base station selection method of FIG. 22 uses a single kind of indicator in determining which base station is optimal for uplink, as well as which base station is optimal for downlink, individually for different communications systems. Afterwards, the method selects a communications system by consulting an indicator of system characteristics and then chooses one of two base stations belonging to the selected communications system. FIG. 22 depicts the case where SIR is used to determine optical base stations while QoS is used as the indicator of system characteristics.

Specifically, out of the base stations a1 and a2 in system A, the one with the best uplink SIR is designated as an optimal station for uplink, while the one with the best downlink SIR is designated as an optimal station for downlink. Likewise, out of the base stations b1 and b2 in system B, the one with the best uplink SIR is designated as an optimal station for uplink, while the one with the best downlink SIR is designated as an optimal station for downlink. For example, stational is designated as an optimal station for uplink of system A, and station a2 is designated as an optimal station for downlink of system A. Likewise, station b1 is designated as an optimal station for uplink of system B, and station b1 is also designated as an optimal station for downlink of system B.

Subsequently either system A or system B is selected based on QoS. For example, system A is selected. Then either the optimal stational for uplink or the optimal station a2 for downlink is selected according the class of data services that the mobile station 100 uses. For example, station a2 is selected because of the priority of downlink.

Figure 23:
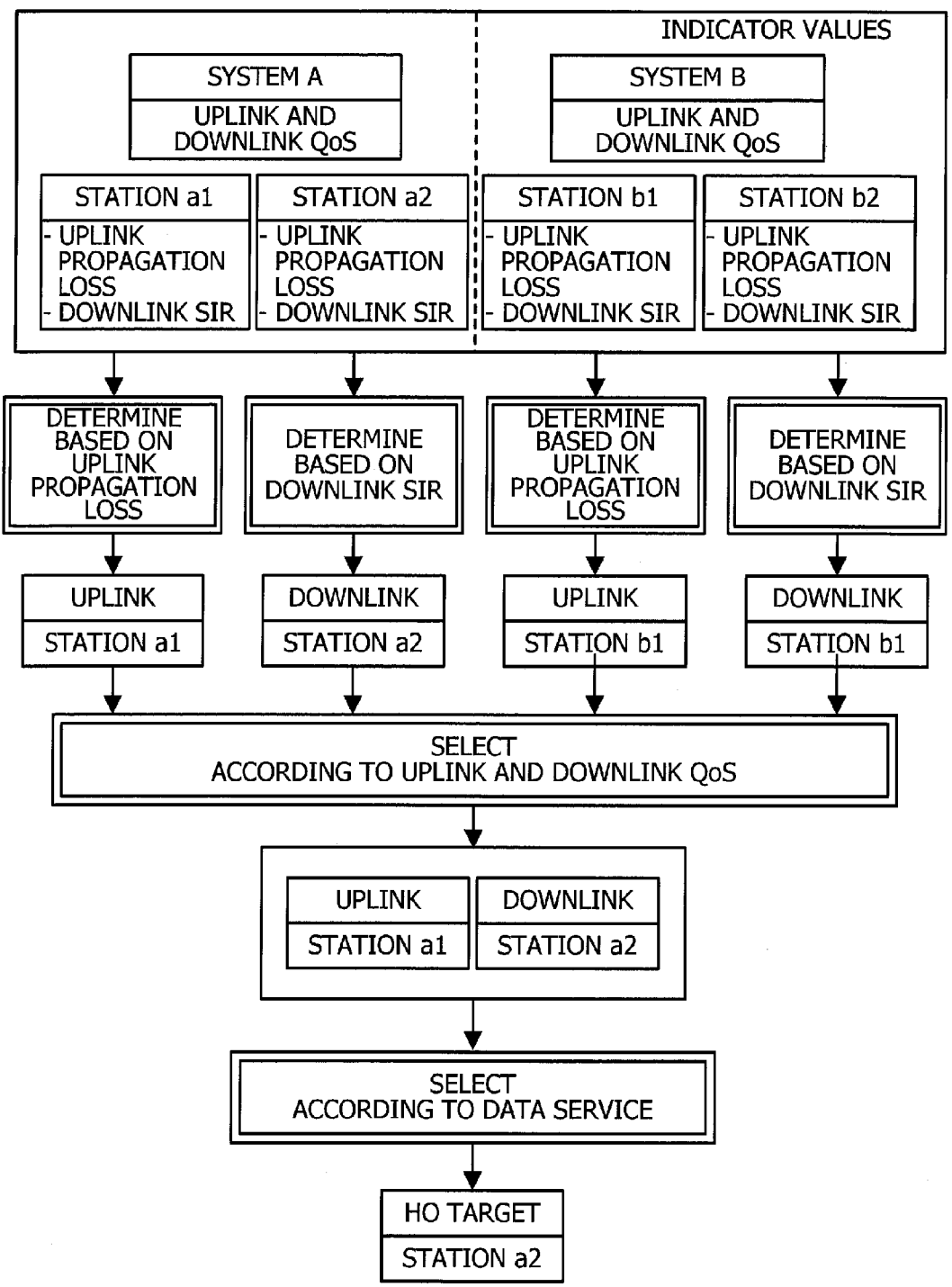
FIG. 23 is a second schematic diagram illustrating a base station selection method according to the third embodiment.

FIG. 23 is a second schematic diagram illustrating a base station selection method according to the third embodiment. The base station selection method of FIG. 23 uses different indicators for uplink and downlink to determine which base station is optimal for uplink, as well as which base station is optimal for downlink, individually for each communications system. The method selects a communications system afterwards by using an indicator of system characteristics and then chooses one of two base stations belonging to the selected communications system. FIG. 23 depicts the case where propagation loss and SIR are used as uplink indicator and downlink indicator, respectively, and QoS is used as the indicator of system characteristics.

Specifically, out of the base stations a1 and a2 in system A, the one with the smallest uplink propagation loss is designated as an optimal station for uplink, while the one with the best downlink SIR is designated as an optimal station for downlink. Likewise, out of the base stations b1 and b2 in system B, the one with the smallest uplink propagation loss is designated as an optimal station for uplink, while the one with the best downlink SIR is designated as an optimal station for downlink. The subsequent process flow is similar to what has been discussed in FIG. 22.

Figure 24:
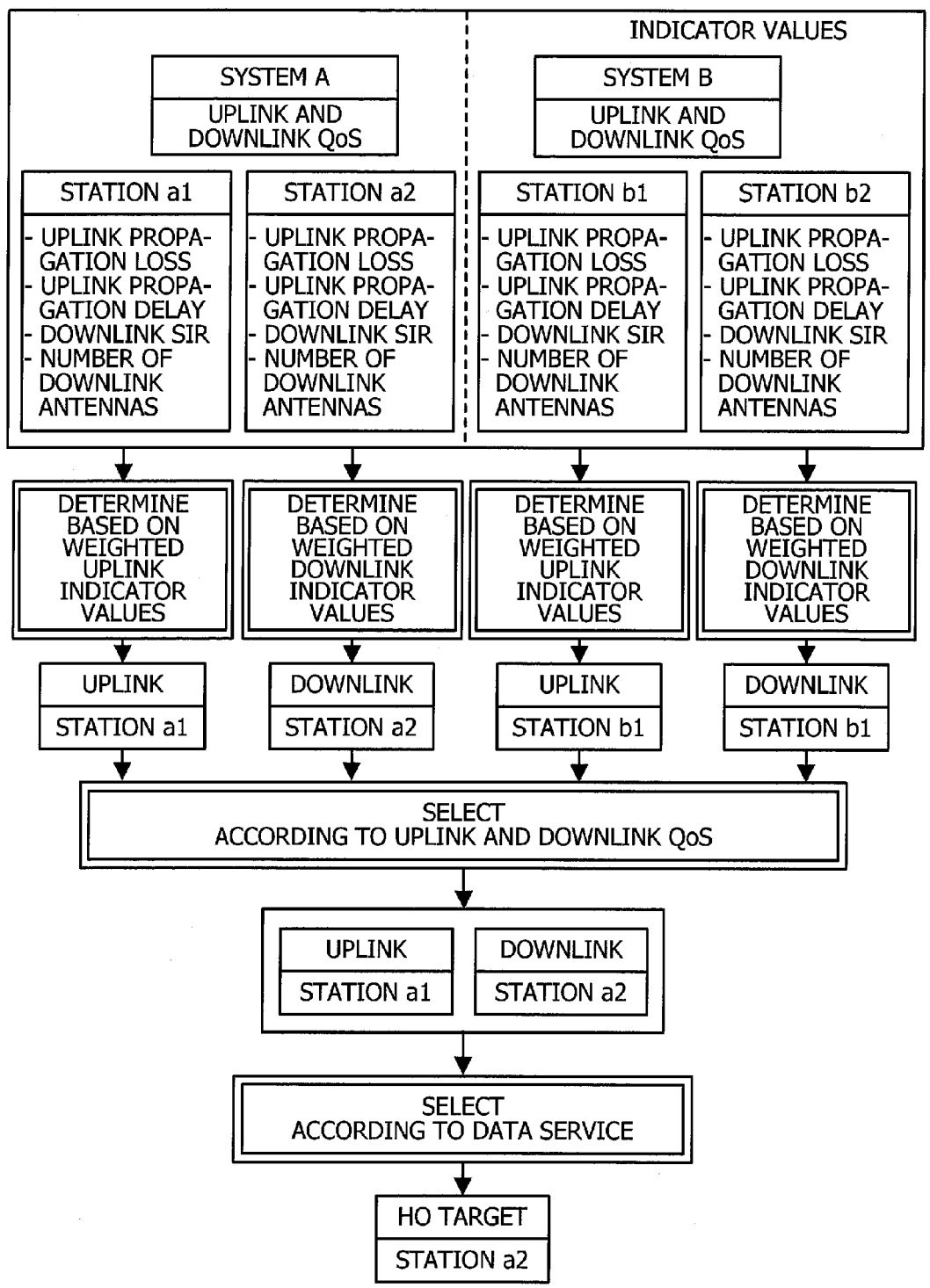
FIG. 24 is a third schematic diagram illustrating a base station selection method according to the third embodiment.

FIG. 24 is a third schematic diagram illustrating a base station selection method according to the third embodiment. The base station selection method of FIG. 24 uses a plurality of indicators to determine optimal base stations for uplink and downlink, for each individual communications system. The method selects a communications system afterwards by using an indicator of system characteristics and then chooses one of two base stations belonging to the selected communications system. FIG. 24 depicts the case where propagation loss and propagation delay are used as indicators of uplink while SIR and the number of antennas are used as indicators of downlink. To determine optimal base stations by using a plurality of indicators, the method calculates priority levels according to the formulas discussed in the first embodiment.

Specifically, out of the base stations a1 and a2 in system A, the one with the highest priority level calculated from uplink propagation loss and uplink propagation delay is designated as an optimal station for uplink, while the one with the highest priority level calculated from downlink SIR and the number of downlink antennas is designated as an optimal station for downlink. Likewise, out of the base stations b1 and b2 in system B, the one with the highest priority level calculated from uplink propagation loss and uplink propagation delay is designated as an optimal station for uplink, while the one with the highest priority level calculated from downlink SIR and the number of downlink antennas is designated as an optimal station for downlink. The subsequent process flow is similar to what has been discussed in FIG. 22.

The methods illustrated in FIGS. 23 and 24 use the same set of indicators for both system A and system B. Those methods may be modified to use different sets of indicators for system A and system B.

The above-described communications system offers the same advantages as the communications system according to the first embodiment. The third embodiment further enables more flexible selection of base stations because it is possible, when the need for a handover arises, to determine whether to allow the handover to take place from one communications system to another. In addition, the third embodiment reduces the workload in evaluating base stations as candidates for the target of handover.

Fourth Embodiment

A fourth embodiment will now be described in detail below with reference to the accompanying drawings. The following description will focus on its difference from the foregoing first embodiment, thus omitting explanation of similar elements. The communications system according to the fourth embodiment assigns the task of handover control, not to the mobile station, but to a server computer on the network.

Figure 25:
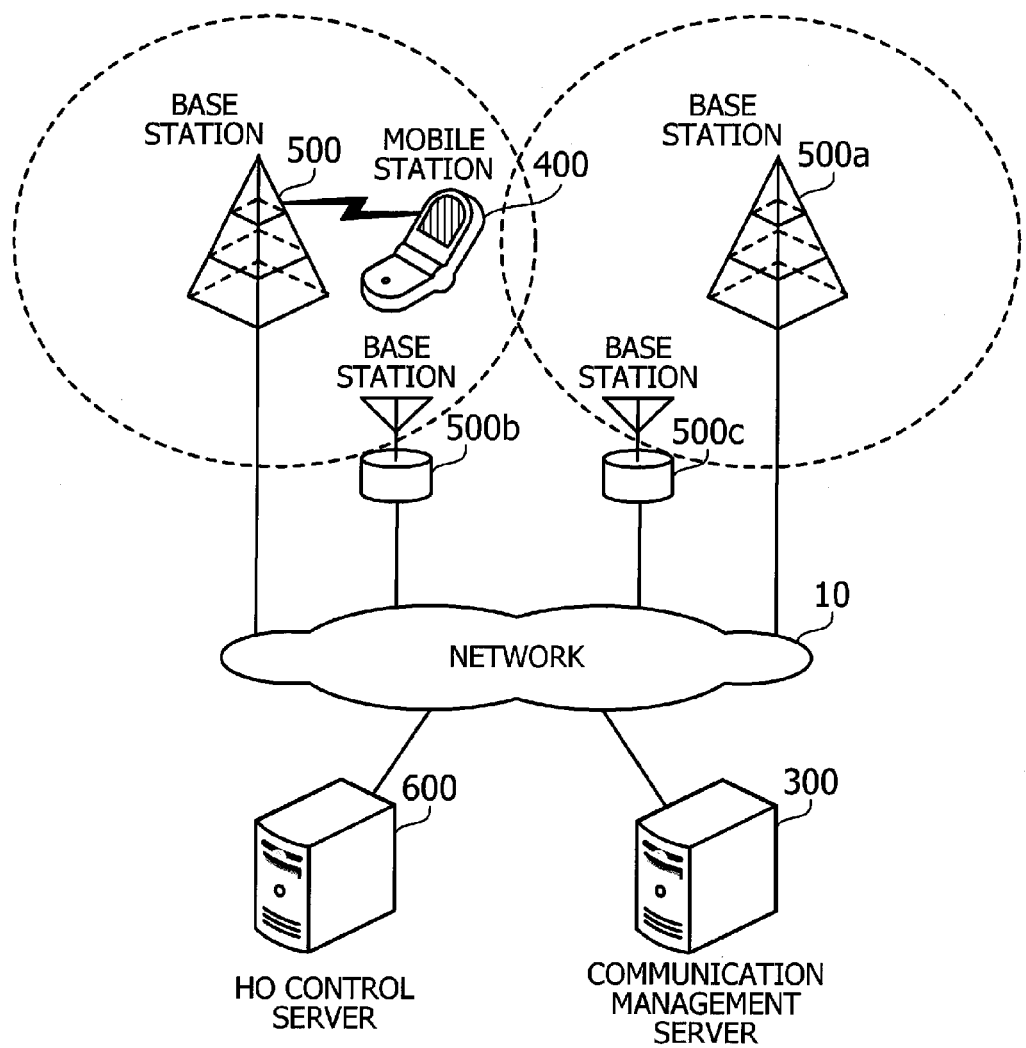
FIG. 25 illustrates a system arrangement of a communications system according to a fourth embodiment.

FIG. 25 illustrates a system arrangement of a communications system according to the fourth embodiment. The communications system illustrated in FIG. 25 is formed from a network 10, a mobile station 400, base stations 500, 500a, 500b, and 500c, a communication management server 300, and an HO control server 600. The base stations 500, 500a, 500b, and 500c, communication management server 300, and HO control server 600 are connected to the network 10. The communication management server 300 has already been explained in the first embodiment.

The mobile station 400 can communicate with a base station via radio waves when it enters the cell of that base station. The HO control server 600 undertakes the task of determining to which base station the mobile station 400 should connect. The mobile station 400 continuously measures communication quality of downlink paths, based on a signal received from each base station 500, 500a, 500b, and 500c, and sends its measurement data to the HO control server 600.

The base stations 500, 500a, 500b, and 500c are communication devices used to transfer packet data between the mobile station 400 and a remote station. The base stations 500, 500a, 500b, and 500c continuously measure the communication quality of uplink paths, based on a signal received from the mobile station 400, and send their measurement data to the HO control server 600. Similar to the first embodiment, the base stations 500 and 500a belong to system A, and the base stations 500b and 500c belong to system B.

The HO control server 600 is a server computer which controls handover of the mobile station 400. The HO control server 600 continuously collects measurement data of each link from the base stations 500, 500a, 500b, and 500c. Also the HO control server 600 continuously collects characteristics data of each communications system from the communication management server 300. Based on the measurement data and characteristics data, the HO control server 600 selects a target base station for handover of the mobile station 400 and notifies the mobile station 400 of the selection as necessary.

Since the HO control server 600 performs handover control for each individual mobile station, the load on the HO control server 600 will increase with the number of mobile stations that the communications system accommodates. In such cases, it may be sensible to deploy a plurality of HO control servers so as to distribute the load.

Figure 26:
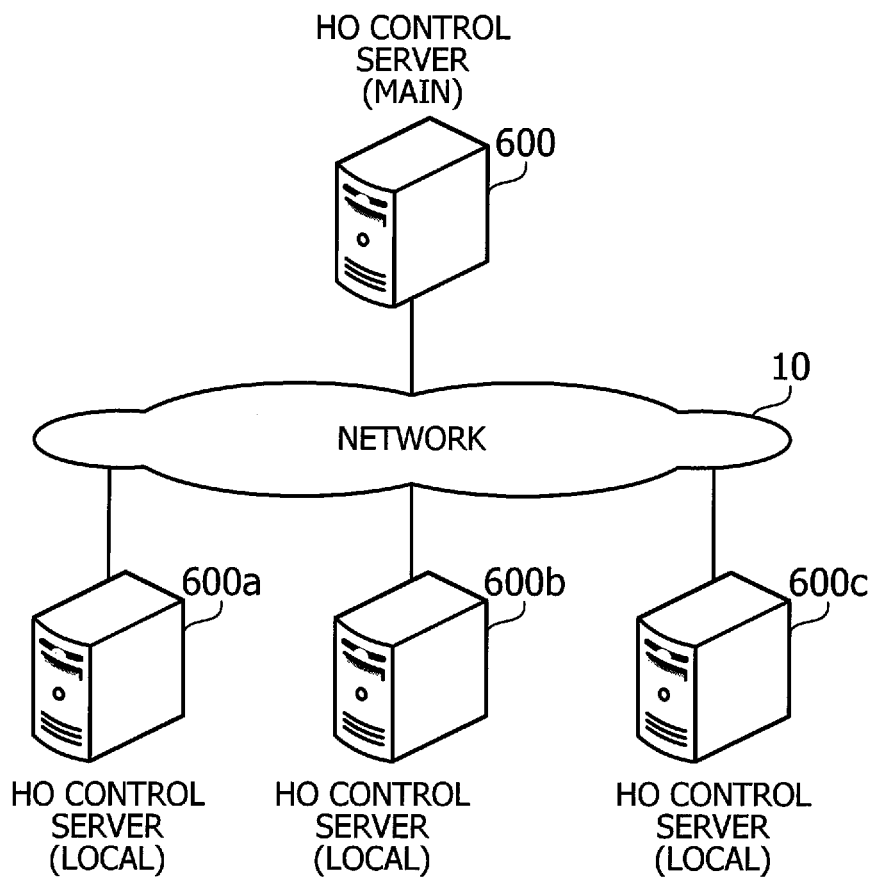
FIG. 26 illustrates an example structure of an HO control server cluster.

FIG. 26 illustrates an example structure of an HO control server cluster. The HO control server cluster of FIG. 26 is a group of server computers which execute a handover control process in a distributed way. HO control servers 600, 600a, 600b, and 600c are connected to a network 10.

The HO control server 600 is a main HO control server which controls the other HO control servers 600a, 600b, and 600c. The HO control servers 600a, 600b, and 600c are local HO control servers each serving a part of the service coverage area of the communications system. Those HO control servers 600a, 600b, and 600c control handover of mobile station in their respective coverage areas.

In this way, a local HO control server is deployed in each local area, so that a hierarchical group of HO control servers is created. This architecture makes it possible to control the workload and memory usage of each HO server. The following description, however, assumes that a single HO control server 600, rather than a hierarchical HO control server cluster, controls handover of all mobile stations, for simplicity purposes.

The mobile station 400, base station 500, and HO control server 600 include modules described below. The other base stations 500a, 500b, and 500c can be realized by using the same module arrangement as the base station 500, although they are not discussed below.

Figure 27:
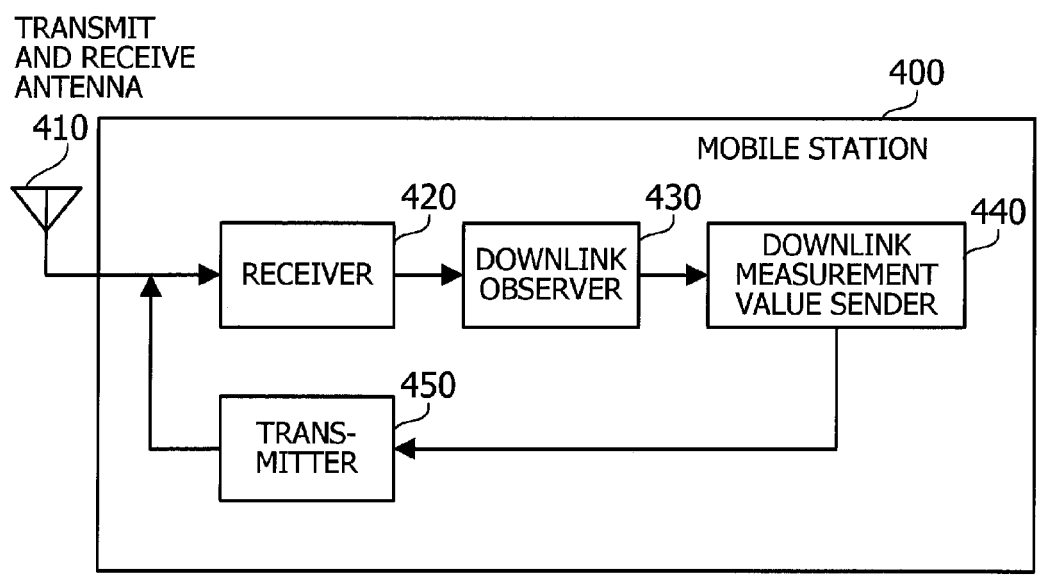
FIG. 27 is a block diagram illustrating functions of a mobile station according to the fourth embodiment.

FIG. 27 is a block diagram illustrating functions of a mobile station according to the fourth embodiment. This mobile station 400 includes a transmit and receive antenna 410, a receiver 420, a downlink observer 430, a downlink measurement value sender 440, and a transmitter 450. Note that FIG. 27 only depicts functions relating to handover control while omitting functions for ordinary call control.

The transmit and receive antenna 410 is a radio antenna used for both transmission and reception of signals. That is, the transmit and receive antenna 410 captures downlink signals that the base stations 500, 500a, 500b, and 500c transmit, and supplies them to the receiver 420. The transmit and receive antenna 410 also transmits radio waves of an uplink signal that the transmitter 450 produces.

Out of the receive signals supplied from the transmit and receive antenna 410, the receiver 420 extracts signals addressed thereto and subjects them to demodulation and decoding. The receiver 420 then supplies the demodulated and decoded data to the downlink observer 430.

The downlink observer 430 extracts control data out of the data supplied from the receiver 420, where the control data indicates the condition of radio waves transmitted by each source base station. The downlink observer 430 also extracts a pilot signal and measures the condition of the downlink communication path by observing the extracted pilot signal. Then the downlink observer 430 supplies the obtained information, or downlink measurement data, to the downlink measurement value sender 440.

The downlink measurement value sender 440 summarizes downlink measurement data supplied from the downlink observer 430 and outputs the summarized measurement data to the transmitter 450 in the form of packet data addressed to the HO control server 600.

The transmitter 450 performs coding and modulation of packet data, control data, and pilot signals produced in the mobile station 400, thereby generating an uplink signal addressed to the currently connected base station. The transmitter 450 outputs this uplink signal to the transmit and receive antenna 410. The transmitter 450 is also responsive to a handover request that the mobile station 400 may receive. Upon receipt of such a request, the transmitter 450 switches its connection to a new base station specified as the target of handover.

Figure 28:
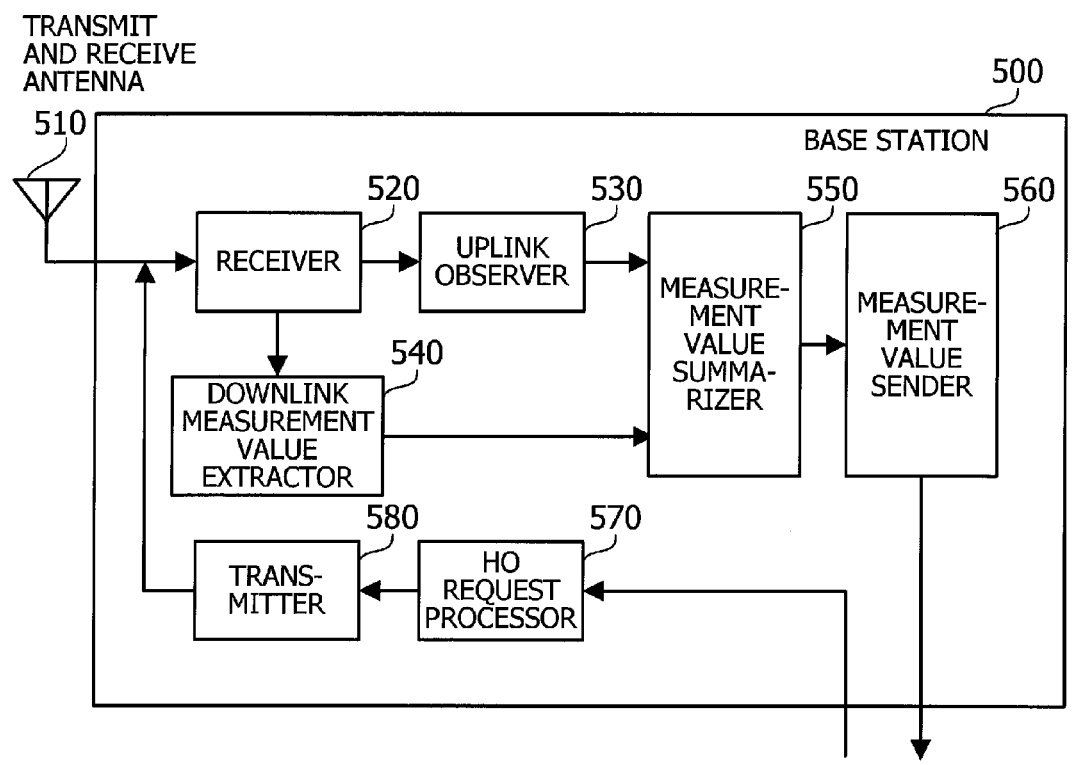
FIG. 28 is a block diagram illustrating functions of a base station according to the fourth embodiment.

FIG. 28 is a block diagram illustrating functions of a base station according to the fourth embodiment. This base station 500 includes a transmit and receive antenna 510, a receiver 520, an uplink observer 530, a downlink measurement value extractor 540, a measurement value summarizer 550, a measurement value sender 560, an HO request processor 570, and a transmitter 580. Note that FIG. 28 only depicts functions relating to handover control while omitting functions for ordinary call control.

The transmit and receive antenna 510 is a radio antenna used for both transmission and reception of signals. The transmit and receive antenna 510 captures uplink signals transmitted by the mobile station 400 and other mobile stations in the cell and supplies the received signals to the receiver 520. The transmit and receive antenna 510 also transmits radio waves of downlink signals that the transmitter 580 produces.

Out of the receive signals supplied from the transmit and receive antenna 510, the receiver 520 extracts signals of individual mobile stations and subjects them to demodulation and decoding. The receiver 520 then supplies the demodulated and decoded data to the uplink observer 530 and downlink measurement value extractor 540.

The uplink observer 530 extracts control data out of the data supplied from the receiver 520, where the control data indicates the condition of radio waves transmitted from the source mobile station. The uplink observer 530 also extracts a pilot signal and measures the condition of the uplink communication path by observing the extracted pilot signal. Then the uplink observer 530 supplies the obtained information, or uplink measurement data, to the measurement value summarizer 550.

Upon receipt of data from the receiver 520, the downlink measurement value extractor 540 extracts downlink measurement data produced by mobile stations if any such information is contained therein. The downlink measurement value extractor 540 supplies the extracted measurement data to the measurement value summarizer 550.

The measurement value summarizer 550 summarizes uplink measurement data supplied from the uplink observer 530 and downlink measurement data supplied from the downlink measurement value extractor 540, on an individual mobile station basis. Then the measurement value summarizer 550 supplies the summarized measurement data to the measurement value sender 560.

The measurement value sender 560 transfers the measurement data from the measurement value summarizer 550 to the HO control server 600 via the network 10.

The HO request processor 570 may receive a handover request via the network 10. Upon receipt of such a request, the HO request processor 570 makes preparations for handover and passes the transmitter 580 a notice addressed to the mobile station that is supposed to execute a handover.

The transmitter 580 performs coding and modulation of packet data, control data, and pilot signals produced in the base station 500. The transmitter 580 outputs the resulting downlink signals to the transmit and receive antenna 510.

Figure 29:
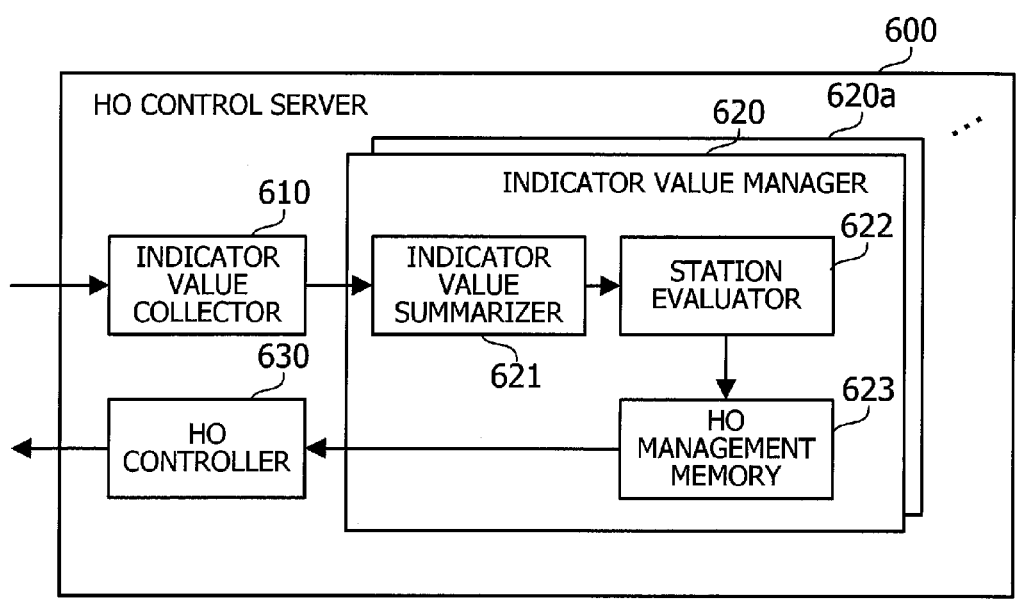
FIG. 29 is a block diagram illustrating functions of an HO control server according to the fourth embodiment.

FIG. 29 is a block diagram illustrating functions of an HO control server. This HO control server 600 includes an indicator value collector 610, indicator value managers 620, 620a, . . . , and an HO controller 630.

The indicator value collector 610 continuously collects measurement data from base stations 500, 500a, 500b, and 500c via the network 10. The indicator value collector 610 sorts the collected measurement data into groups corresponding to individual mobile stations and sends the results to their corresponding indicator value managers. The indicator value collector 610 also collects characteristics data continuously from the communication management server 300 via the network 10, and supplies indicator value managers 620, 620a, . . . with the collected characteristics data.

Based on the measurement data and characteristics data collected from the indicator value collector 610, the indicator value managers 620, 620a, . . . determine candidates for the target base station for handover. The indicator value managers 620, 620a, . . . are each assigned a single mobile station. The indicator value manager 620, for example, is designated to serve the mobile station 400. The HO control server 600 contains as many indicator value managers as the number of mobile stations that the communications system can accommodate.

The indicator value manager 620 includes an indicator value summarizer 621, a station evaluator 622, and an HO management memory 623. The other indicator value managers 620a, . . . are also realized by using this arrangement of modules.

The indicator value summarizer 621 summarizes uplink measurement data and downlink measurement data received from the indicator value collector 610, individually for each base station. The indicator value summarizer 621 also summarizes characteristics data received from the indicator value collector 610, individually for each communications system. The indicator value summarizer 621 outputs the summarized measurement data and characteristics data to the station evaluator 622.

Upon receipt of measurement data and characteristics data from the indicator value summarizer 621, the station evaluator 622 saves them in an HO management memory 623. Based on the measurement data and characteristics data, the station evaluator 622 compares base stations 500, 500a, 500b, and 500c with each other to determine which base station is optimal for standby, which base station is optimal for uplink communication, and which base station is optimal for downlink communication. The station evaluator 622 then saves the determination results in the HO management memory 623 as base station data.

The HO management memory 623 stores the latest measurement data indicating communication quality between the mobile station 400 and each base station, the latest characteristics data indicating system characteristics of each communications system, and the latest base station data indicating candidate base stations for connection. The measurement data, characteristics data, and base station data are updated by the station evaluator 622 as occasion demands.

The HO controller 630 monitors updates made to the base station data stored in the HO management memory 623 in the indicator value manager 620. When the mobile station 400 is engaged in a communication session, the HO controller 630 determines which of the uplink and downlink directions is of priority, based on what data service is used in the communication session. The HO controller 630 then selects an optimal target base station determined for the priority direction and thus makes preparations for a subsequent handover operation. The HO controller 630 serves other mobile stations in the same way.

As can be seen from the above explanation, the fourth embodiment employs an HO control server 600 to collect uplink measurement data from each base station, downlink measurement data via the base station to which the mobile station 400 is currently connected, and characteristics data form the communication management server 300. The HO control server 600 determines a target base station for handover, based on the collected measurement data and characteristics data.

The HO control server 600 stores such measurement data, characteristics data, and base station data in the data structures similar to the ones discussed in the first embodiment. Also the process flow that the HO control server 600 executes in its handover control is similar to the one executed by a mobile station 100 in the first embodiment.

The following section will now describe how the mobile station 400, base station 500, 500*a*, 500*b*, and 500*c*, HO control server 600, and communication management server 300 interact with each other during the course of handover. It is assumed in the following description that the mobile station 400 is initially in the standby state, and that two base stations 500 and 500*a* have been designated as an optimal-for-standby station and an optimal-for-communication station, respectively.

Figure 30:
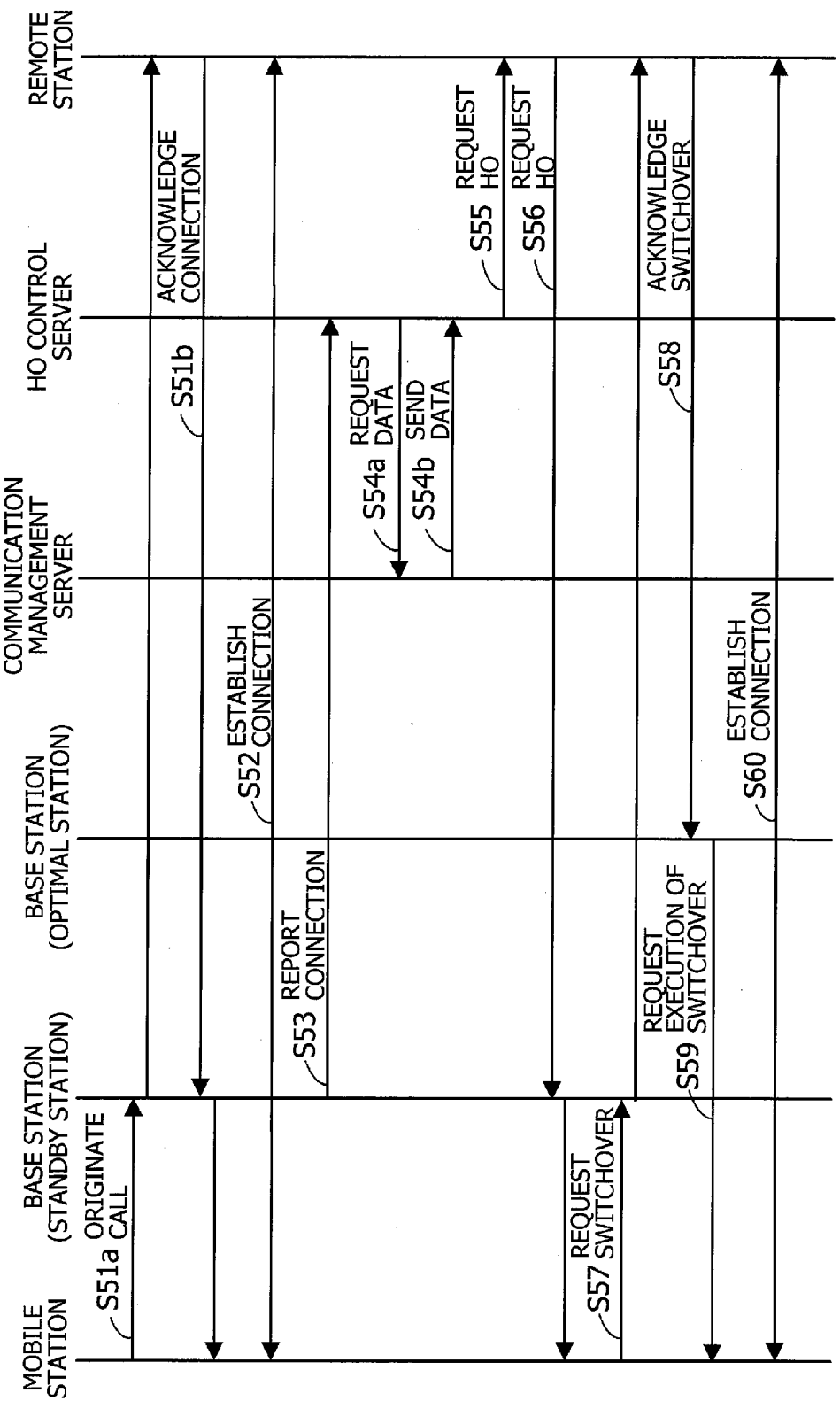
FIG. 30 is a first sequence diagram illustrating a communication flow according to the fourth embodiment.

FIG. 30 is a first sequence diagram illustrating a communication flow according to the fourth embodiment. The sequence diagram of FIG. 30 assumes that a communication session is initiated by the mobile station 400. Each processing step of FIG. 30 will be described below in the order of step numbers indicated therein.

[Step S51*a*] The mobile station 400 sends a communication request to the base station 500. Upon receipt of this communication request, the base station 500 sends a connection request to the called remote station via the network 10.

[Step S51*b*] In response to the connection request at step S51*a*, the remote station returns an acknowledgment to the base station 500 via the network 10. The base station 500 informs the mobile station 400 of the acknowledgment.

[Step S52] A connection is established between the mobile station 400 and the remote station, where the base station 500 acts as a relay point of their communication.

[Step S53] The base station 500 informs the HO control server 600 that the mobile station 400 has connected to the base station 500 and started a communication session. At this time, the base station 500 also notifies the HO control server 600 of the name of the data service that the mobile station 400 uses, as well as of the remote station.

[Step S54*a*] Via the network 10, the HO control server 600 requests the communication management server 300 to provide characteristics data.

[Step S54*b*] In response to the request at step S54*a*, the communication management server 300 transmits characteristics data of each communications system to the HO control server 600.

[Step S55] According to the data service that the mobile station 100 uses, the HO control server 600 selects a target base station for handover (i.e., base station 500*a*). The HO control server 600 then sends a handover request to the remote station with which the mobile station 400 is communicating.

[Step S56] In response to the handover request at step S55, the remote station sends a handover request to the base station 500 via the network 10. The base station 500 forwards the handover request toward the mobile station 400, which brings the mobile station 400 into a state of being ready to switch its connection.

[Step S57] The mobile station 400 sends a switchover request to the base station 500 to initiate switchover between base stations. The base station 500 forwards this switchover request to the remote station via the network 10.

[Step S58] In response to the switchover request at step S57, the remote station returns a completion notice to the base station 500*a* via the network 10.

[Step S59] The base station 500*a* requests the mobile station 400 to switch its connection. Accordingly, the mobile station 400 switches its connection from the base station 500 to the base station 500*a*.

[Step S60] A connection is established between the mobile station 400 and the remote station, where the base station 500 acts as a relay point of their communication.

As can be seen from the above, the mobile station 400 initiates a communication session via the standby base station serving the mobile station 400. The standby base station then informs the HO control server 600 of the initiated communication session. In response, the HO control server 600 selects an optimal target base station for handover, and sends a handover request to the remote station with which the mobile station 400 is communicating. Subsequently, the remote station interacts with the mobile station 400 via the source and target base stations of handover, thus switching the connection.

It is assumed in FIG. 30 that a handover request is issued from the remote station. Alternatively, the mobile station 400 may issue a handover request, and in that case, the HO control server 600 informs the mobile station 400 which base station should be the target of handover. Also, while FIG. 30 illustrates a case where the HO control server 600 collects characteristics data upon origination of a call, the HO control server 600 may skip that step if it has collected such data recently. In that case, the HO control server 600 uses the latest characteristics data collected before the call origination, instead of collecting another set of characteristics data.

Figure 31:
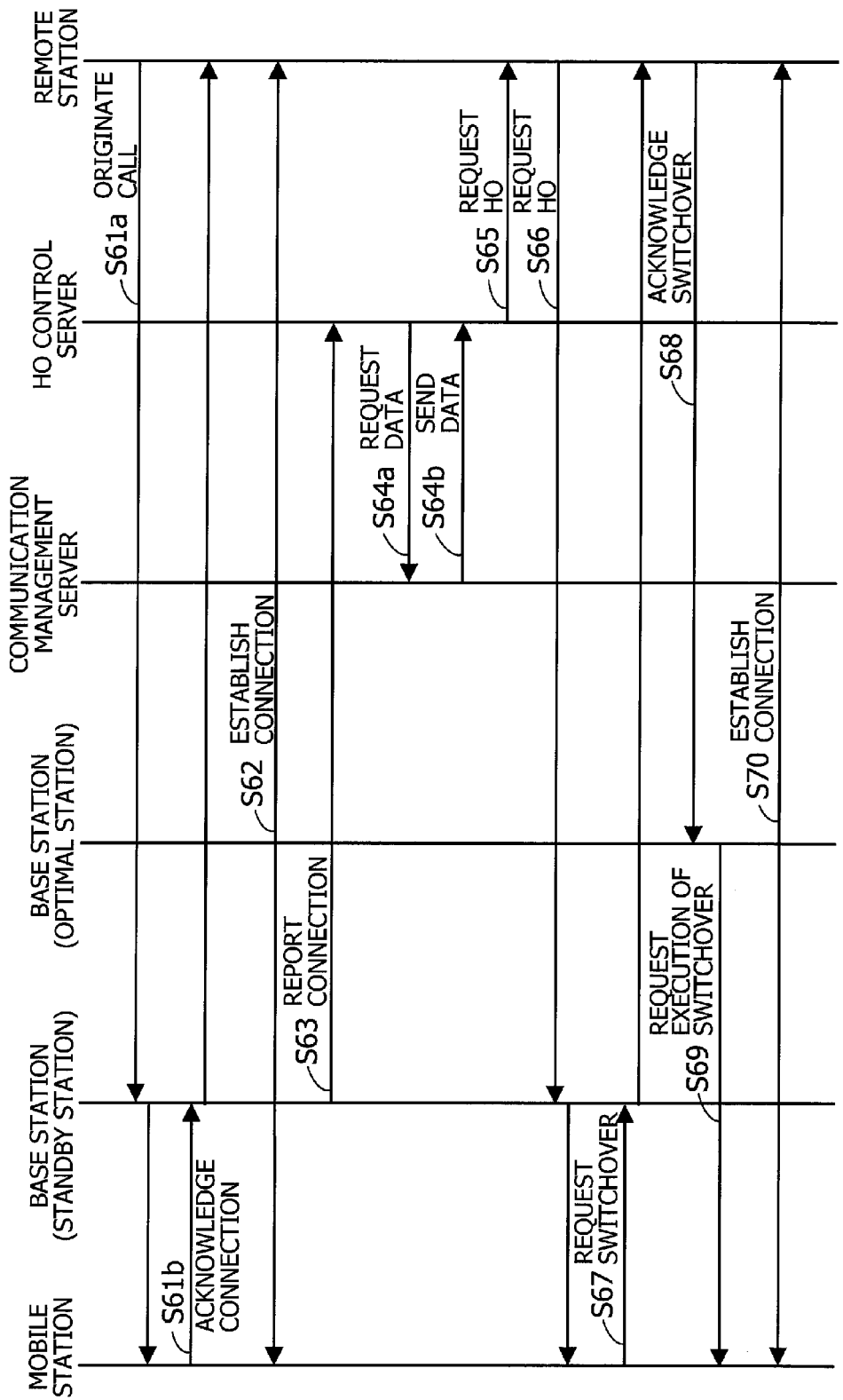
FIG. 31 is a second sequence diagram illustrating a communication flow according to the fourth embodiment.

FIG. 31 is a second sequence diagram illustrating a communication flow according to the fourth embodiment. The sequence diagram of FIG. 31 assumes that a remote station initiates a communication session with the mobile station 400. While FIG. 31 depicts steps S61*a* to S70, the following description will not discuss steps S63 to S70 because of their similarity to steps S53 to S60 explained in FIG. 30. Steps S61*a* to S62 will now be described below according to the order of step numbers.

[Step S61*a*] The remote station sends a connection request to the base station 500 via the network 10. Upon receipt of this connection request, the base station 500 sends a connection request to the mobile station 400.

[Step S61*b*] In response to the connection request at step S61*a*, the mobile station 400 returns an acknowledgment to the base station 500. The base station 500 informs the remote station of the acknowledgment.

[Step S62] A connection is established between the mobile station 400 and the remote station, where the base station 500 acts as a relay point of their communication.

As can be seen from the above, a remote station initiates a communication session with the mobile station 400 via the standby base station serving the mobile station 400. The standby base station then informs the HO control server 600 of the initiated communication session. In response, the HO control server 600 selects an optimal target base station for handover, and sends a handover request to the remote station with which the mobile station 400 is communicating. Subsequently, the remote station interacts with the mobile station 400 via the source and target base stations of handover, thus switching the connection.

According to the above-described communications system, the HO control server 600 collects measurement data indicating the current communication quality, as well as characteristics data indicating system characteristics of each communications system. The HO control server 600 then selects an optimal target base station according to the class of data services that the mobile station 400 uses. This feature enables more efficient use of radio resources, as well as contributing to further reduction of power consumption of the mobile station 400. The above technique also makes it easier to realize handover across different communications systems. In addition, the HO control server 600 permits centralized control of handover, which gives enhanced maintainability and scalability to the communications system.

Fifth Embodiment

A fifth embodiment will now be described in detail below with reference to the accompanying drawings. The following description will focus on its difference from the foregoing first embodiment, thus omitting explanation of similar elements. The communications system according to the fifth embodiment assigns the task of handover control to base stations.

Figure 32:
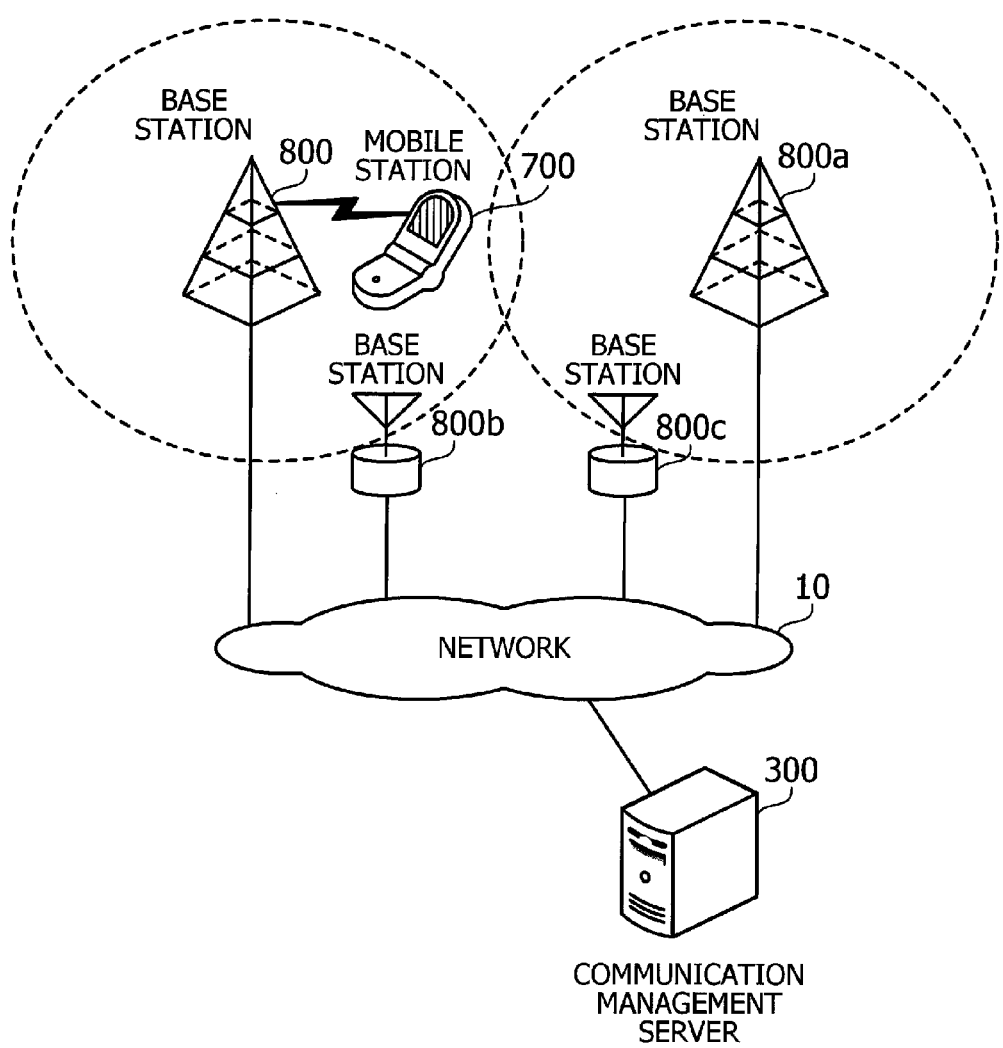
FIG. 32 illustrates a system arrangement of a communications system according to a fifth embodiment.

FIG. 32 illustrates a system arrangement of a communications system according to the fifth embodiment. The communications system of this fifth embodiment is formed from a network 10, a mobile station 700, base stations 800, 800a, 800b, and 800c, and a communication management server 300. The mobile station 700, base stations 800, 800a, 800b, and 800c, and communication management server 300 are connected to the network 10. The communication management server 300 has already been explained in the first embodiment.

The mobile station 700 can communicate with a base station via radio waves when it enters the cell of that base station. In handover of the mobile station 700, the target base station is determined by the base station to which the mobile station 700 is currently connected. The mobile station 700 continuously measures communication quality of downlink paths, based on a signal received from each base station 800, 800a, 800b, and 800c, and sends that measurement data to the currently connected base station.

The base stations 800, 800a, 800b, and 800c are communication devices used to transfer packet data between the mobile station 700 and a remote station. The base stations 800, 800a, 800b, and 800c also undertake the task of handover control. Those base stations 800, 800a, 800b, and 800c continuously collect measurement data indicating the quality of communication with the mobile station 700. They also communicate continuously with the communication management server 300 to collect characteristics data indicating system characteristics of each communications system. The collected measurement data and characteristics data will be used to determine a target base station for handover.

Similar to the first embodiment, the base stations 800 and 800a belong to system A, and the base stations 800b and 800c belong to system B.

The following will describe what modules constitute the mobile station 700 and base station 800. The other base stations 800a, 800b, and 800c can be realized by using the same module arrangement as the base station 800, although their details are not discussed below.

Figure 33:
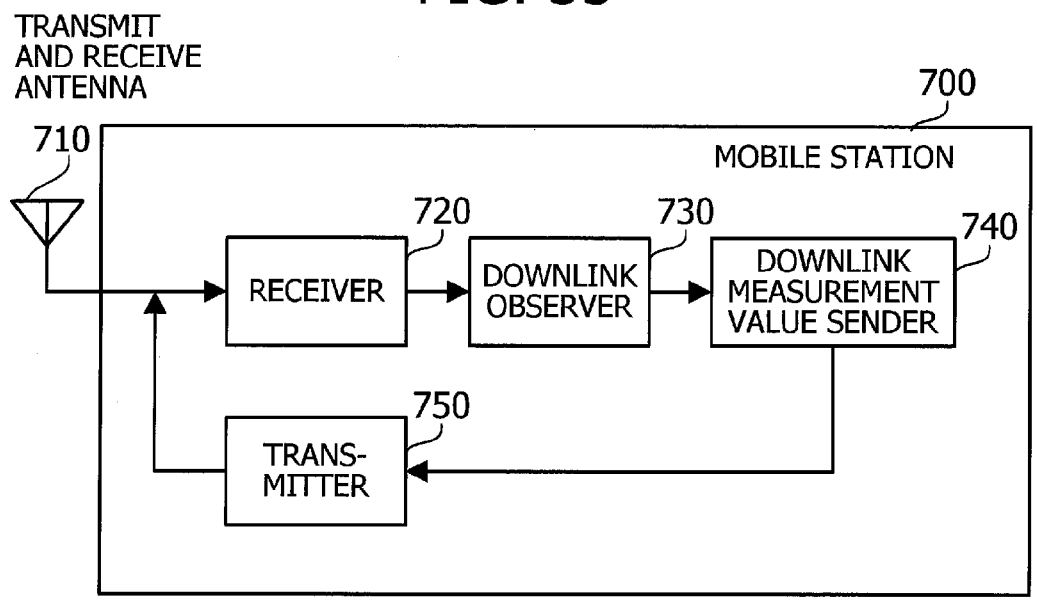
FIG. 33 is a block diagram illustrating functions of a mobile station according to the fifth embodiment.

FIG. 33 is a block diagram illustrating functions of a mobile station according to the fifth embodiment. This mobile station 700 includes a transmit and receive antenna 710, a receiver 720, a downlink observer 730, a downlink measurement value sender 740, and a transmitter 750. Note that FIG. 33 only depicts functions relating to handover control while omitting functions for ordinary call control.

The transmit and receive antenna 710 is a radio antenna used for both transmission and reception of signals. That is, the transmit and receive antenna 710 captures downlink signals that the base stations 800, 800a, 800b, and 800c transmit, and supplies them to the receiver 720. The transmit and receive antenna 710 also transmits radio waves of an uplink signal that the transmitter 750 produces.

Out of the receive signals supplied from the transmit and receive antenna 710, the receiver 720 extracts signals addressed thereto and subjects them to demodulation and decoding. The receiver 720 then supplies the demodulated and decoded data to the downlink observer 730.

The downlink observer 730 extracts control data out of the data supplied from the receiver 720, where the control data indicates the condition of radio waves transmitted by each source base station. The downlink observer 730 also extracts a pilot signal and measures the condition of the downlink communication path by observing the extracted pilot signal. Then the downlink observer 730 supplies the obtained information, or downlink measurement data, to the downlink measurement value sender 740.

The downlink measurement value sender 740 summarizes downlink measurement data supplied from the downlink observer 730 and outputs the summarized measurement data to the transmitter 750 in the form of packet data addressed to the currently connected base station.

The transmitter 750 performs coding and modulation of packet data, control data, and pilot signals produced in the mobile station 700, thereby generating an uplink signal addressed to the currently connected base station. The transmitter 750 outputs this uplink signal to the transmit and receive antenna 710. The transmitter 750 is also responsive to a handover request that the mobile station 700 may receive. Upon receipt of such a request, the transmitter 750 switches its connection to a new base station specified as the target of handover.

Figure 34:
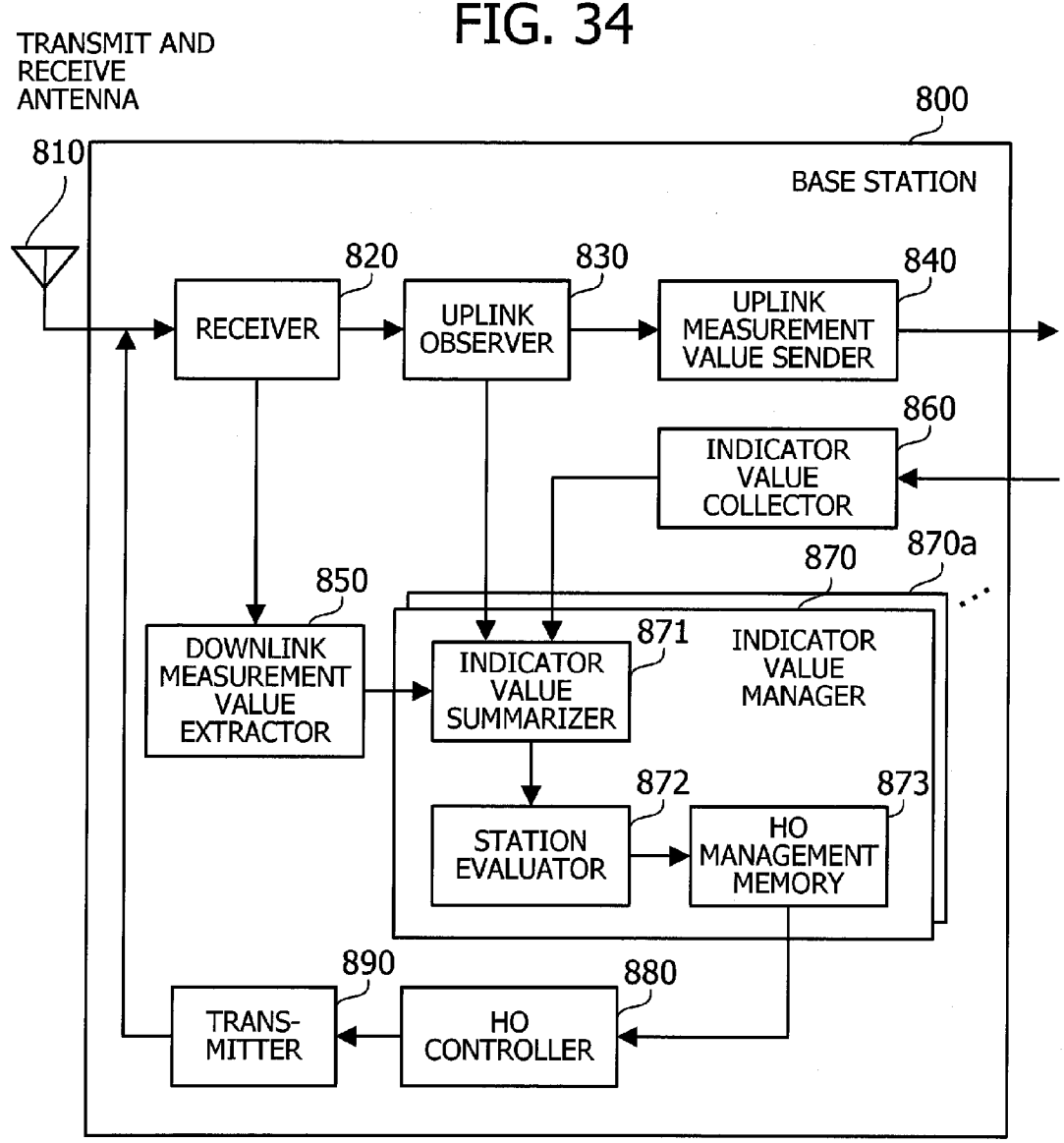
FIG. 34 is a block diagram illustrating functions of a base station according to the fifth embodiment.

FIG. 34 is a block diagram illustrating functions of a base station according to the fifth embodiment. This base station 800 includes a transmit and receive antenna 810, a receiver 820, an uplink observer 830, an uplink measurement value sender 840, a downlink measurement value extractor 850, an indicator value collector 860, indicator value managers 870, 870a, . . . , an HO controller 880, and a transmitter 890. Note that FIG. 34 only depicts functions relating to handover control while omitting functions for ordinary call control.

The transmit and receive antenna 810 is a radio antenna used for both transmission and reception of signals. The transmit and receive antenna 810 captures uplink signals transmitted by the mobile station 700 and other mobile stations in the cell and supplies them to the receiver 820. The transmit and receive antenna 810 also transmits radio waves of downlink signals that the transmitter 890 produces.

Out of the receive signals supplied from the transmit and receive antenna 810, the receiver 820 extracts signals of individual mobile stations and subjects them to demodulation and decoding. The receiver 820 then supplies the demodulated and decoded data to the uplink observer 830 and downlink measurement value extractor 850.

The uplink observer 830 extracts control data out of the data supplied from the receiver 820, where the control data indicates the condition of radio waves transmitted from the source mobile station. The uplink observer 830 also extracts a pilot signal and measures the condition of the uplink communication path by observing the extracted pilot signal. The uplink observer 830 outputs the obtained information as uplink measurement data. For mobile stations currently connected to the base station 800, the uplink observer 830 outputs their measurement data to the uplink measurement value managers associated with them. For mobile stations currently connected to other base stations 800a, 800b, and 800c, the uplink observer 830 outputs their measurement data to the uplink measurement value sender 840.

The uplink measurement value sender 840 transfers the uplink measurement data from the uplink observer 830 to relevant base stations via the network 10.

The downlink measurement value extractor 850 receives data from the receiver 820 and extracts therefrom downlink measurement data produced by mobile stations if any such information is contained therein. The downlink measurement value extractor 850 outputs the extracted measurement data to indicator value managers corresponding to the source mobile stations.

As to the mobile stations currently connected to the base station 800, the indicator value collector 860 collects their uplink measurement data from other base station 800a, 800b, and 800c via the network 10. The indicator value collector 860 outputs the collected measurement data of such mobile stations to their associated uplink measurement value managers. The indicator value collector 860 also collects characteristics data of each communications system from the communication management server 300 via the network 10, and supplies the indicator value managers 870, 870a, . . . with the collected characteristics data.

Based on the uplink measurement data collected from the uplink observer 830 and indicator value collector 860, downlink measurement data collected from the downlink measurement value extractor 850, and characteristics data collected from the indicator value collector 860, the indicator value managers 870, 870a, . . . determine candidates for the target base station for handover. The indicator value managers 870, 870a, . . . are each assigned a single mobile station. For example, the indicator value manager 870 is designated to serve the mobile station 700. The base station 800 contains as many indicator value managers as the number of mobile stations that the base station 800 can serve.

The indicator value manager 870 includes an indicator value summarizer 871, a station evaluator 872, and an HO management memory 873. The other indicator value managers 870a, . . . can also be realized by using this arrangement of modules.

The indicator value summarizer 871 summarizes the collected uplink measurement data and downlink measurement data on an individual base station basis. The indicator value summarizer 871 also summarizes the collected characteristics data on an individual communications system basis. Then the indicator value summarizer 871 outputs the summarized measurement data and characteristics data to the station evaluator 872.

Upon receipt of measurement data and characteristics data from the indicator value summarizer 871, the station evaluator 872 saves them in an HO management memory 873. Based on the measurement data and characteristics data, the station evaluator 872 compares base stations 800, 800a, 800b, and 800c with each other to determine which base station is optimal for standby, which base station is optimal for uplink communication, and which base station is optimal for downlink communication. The station evaluator 872 then saves the determination results in the HO management memory 873 as base station data.

The HO management memory 873 stores the latest measurement data indicating communication quality between the mobile station 700 and each base station, the latest characteristics data indicating system characteristics of each communications system, and the latest base station data indicating candidate base stations for connection. The measurement data, characteristics data, and base station data are updated by the station evaluator 872 as occasion demands.

The HO controller 880 monitors updates made to the base station data stored in the HO management memory 873 in the indicator value manager 870. When the mobile station 700 is engaged in a communication session, the HO controller 880 determines which of the uplink and downlink directions has priority, based on what data service is used in the communication session. The HO controller 880 then selects an optimal target base station determined for the priority direction and thus makes preparations for a subsequent handover operation. The HO controller 630 serves other mobile stations in the same way.

The transmitter 890 performs coding and modulation of packet data, control data, and pilot signals produced in the base station 800. The transmitter 890 outputs the resulting downlink signals to the transmit and receive antenna 810.

As can be seen from the above explanation, the fifth embodiment offers base stations 800, 800a, 800b, and 800c configured to produce uplink measurement data, as well as to collect downlink measurement data from a mobile station 700 and characteristics data from a communication management server 300. These base stations 800, 800a, 800b, and 800c determine a target base station for handover, based on the collected measurement data and characteristics data.

The base stations 800, 800a, 800b, and 800c store such measurement data, characteristics data, and base station data in the data structures similar to the ones discussed in the first embodiment. Also the process flow that the base stations 800, 800a, 800b, and 800c execute in their handover control is similar to the one executed by a mobile station 100 in the first embodiment.

The following section will now describe a communication flow in a handover operation involving a mobile station 700, base stations 800, 800a, 800b, and 800c, and communication management server 300. It is assumed in the following description that the mobile station 700 is initially in the standby state, and that two base stations 800 and 800a have been designated as an optimal-for-standby station and an optimal-for-communication station, respectively.

Figure 35:
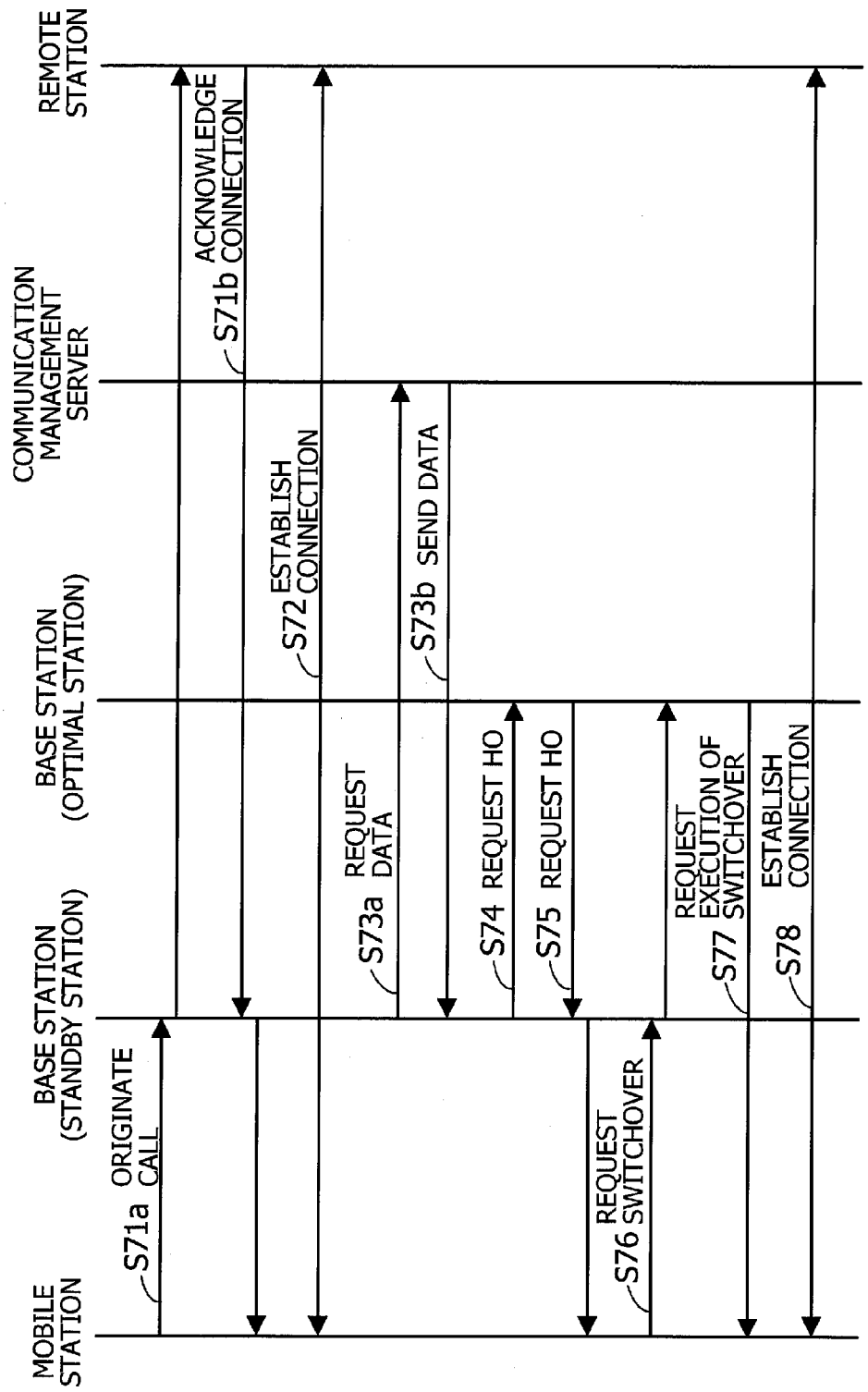
FIG. 35 is a first sequence diagram illustrating a communication flow according to the fifth embodiment.

FIG. 35 is a first sequence diagram illustrating a communication flow according to the fifth embodiment. The sequence diagram of FIG. 35 assumes that a communication session is initiated by the mobile station 700. Each processing step of FIG. 35 will be described below in the order of step numbers indicated therein.

[Step S71a] The mobile station 700 sends a communication request to the base station 800. Upon receipt of this communication request, the base station 800 sends a connection request to the called remote station via the network 10.

[Step S71b] In response to the connection request at step S71a, the remote station returns an acknowledgment to the base station 800 via the network 10. The base station 800 informs the mobile station 700 of the acknowledgment.

[Step S72] A connection is established between the mobile station 700 and the remote station, where the base station 800 acts as a relay point of their communication.

[Step S73a] Via the network 10, the base station 800 requests the communication management server 300 to provide characteristics data.

[Step S73b] In response to the request issued at step S73a, the communication management server 300 transmits characteristics data of each communications system to the base station 800.

[Step S74] According to the data service that the mobile station 700 uses, the base station 800 selects a target base station for handover (i.e., base station 800a). The base station 800 then sends a handover request to the base station 800a.

[Step S75] In response to the handover request at step S74, the base station 800a sends a handover request to the base station 800. The base station 800 thus transfers the handover request to the mobile station 700, which brings the mobile station 700 into a state of being ready to switch its connection.

[Step S76] The mobile station 700 sends a switchover request to the base station 800 to initiate switchover between base stations. The base station 800 transfers the switchover request to the base station 800a.

[Step S77] In response to the switchover request at step S76, the base station 800a requests the mobile station 700 to switch its connection. The mobile station 700 thus switches its connection from the base station 800 to the base station 800a.

[Step S78] A connection is established between the mobile station 700 and the remote station, where the base station 800a now acts as a relay point of their communication.

As can be seen from the above, the mobile station 700 initiates a communication session via the standby base station. This causes the standby base station to select a target base station optimal for handover and send a handover request to that target base station. Subsequently the target base station communicates with the mobile station 700 via the source base station of handover, thus switching the connection. While FIG. 35 illustrates a case where the standby base station collects characteristics data upon origination of a call, the standby base station may skip that step if it has collected such data recently. In that case, the standby base station uses the latest characteristics data collected before the call origination, instead of collecting another set of characteristics data.

FIG. 36 is a second sequence diagram illustrating a communication flow according to the fifth embodiment. The sequence diagram of FIG. 36 assumes that a remote station initiates a communication session with the mobile station 700. While FIG. 36 depicts steps S81a to S88, the following description will not discuss steps S83a to S88 because of their similarity to steps S73a to S78 explained in FIG. 35. Steps S81a to S82 will now be described below according to the order of step numbers.

[Step S81a] The remote station sends a connection request to the base station 800 via the network 10. Upon receipt of this connection request, the base station 800 sends a connection request to the mobile station 700.

[Step S81b] In response to the connection request at step S81a, the mobile station 700 returns an acknowledgment to the base station 800. The base station 800 informs the remote station of the acknowledgment.

[Step S82] A connection is established between the mobile station 700 and the remote station, where the base station 800 acts as a relay point of their communication.

As can be seen from the above, a remote station initiates a communication session with a mobile station 700 via the standby base station serving the mobile station 700. This causes the standby base station to select a target base station optimal for handover and send a handover request to that target base station. Subsequently the target base station communicates with the mobile station 700 via the source base station of handover, thus switching the connection.

According to the above-described communications system, the base stations 800, 800a, 800b, and 800c are configured to collect measurement data indicating the current communication quality, as well as characteristics data indicating system characteristics of each communications system. The base stations 800, 800a, 800b, and 800c then select an optimal target base station according to the class of data services that the mobile station 700 uses. This feature enables more efficient use of radio resources, as well as contributing to further reduction of power consumption of the mobile station 700. The above technique also makes it easier to realize handover across different communications systems. In addition, the above technique enables quick handover operations at the discretion of base stations 800, 800a, 800b, and 800c.

The above sections have described first to fifth embodiments. Features of those embodiments may be combined to build a communications system. The first to fifth embodiments may also be modified so as to determine a target of handover by using predefined fixed values as indicator values indicating system characteristics, rather than dynamically collecting indicator values from communications systems. When this is the case, average values and worst values estimated in the design may be used as fixed indicator values.

According to the embodiments, optimal base stations are determined individually for uplink and downlink, and either the optimal base station for uplink or the optimal base station for downlink is selected according to what class of data services the mobile station uses. This feature enables, in a handover operation, appropriate selection of a target base station suitable for the class of data services used. The described technique can be applied to various communications systems in a flexible way.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A handover control method for selecting a target base station for handover of a mobile station from among a plurality of base stations, the handover control method comprising:

collecting measurement data that indicates communication quality of uplink and downlink paths between the mobile station and each of a plurality of first base stations belonging to a first communications system, and that indicates communication quality of uplink and downlink paths between the mobile station and each of a plurality of second base stations belonging to a second communications system;

evaluating which first base station is optimal for uplink, as well as which first base station is optimal for downlink, from among the first base stations belonging to the first communications system, and evaluating which second base station is optimal for uplink, as well as which second base station is optimal for downlink, from among the second base stations belonging to the second communications system, based on the collected measurement data;

determining which one of a plurality of communications systems including the first communications system and the second communications system is to be used and which link has priority, either uplink or downlink, according to a class of data services that the mobile station uses in radio communication, after both said evaluating for the first communications system and said evaluating for the second communications system are performed;

selecting, when the first communications system is determined to be used, as a target base station for handover the first base station that belongs to the first communications system and has been determined as being optimal for the link determined to have priority; and selecting, when the second communications system is determined to be used, as a target base station for handover the second base station that belongs to the second communications system and has been determined as being optimal for the link determined to have priority.

2. The handover control method according to claim 1, wherein:
said collecting further collects characteristics data indicating system characteristics of each communications system; and
said determining determines which communications system is to be used, based on the collected characteristics data, as well as on the class of data services that the mobile station uses.

3. The handover control method according to claim 1, wherein said determining determines to use the communications system that includes a base station to which the mobile station is currently connected.

4. The handover control method according to claim 1, wherein:
said evaluating, for the first communications system, evaluates which first base station is optimal for uplink and which first base station is optimal for downlink, for each of different classes of data services; and
said selecting selects, when the first communications system is determined to be used, a target base station for handover, based on the class of data services that the mobile station uses and the link determined to have priority.

5. The handover control method according to claim 1, wherein:
the measurement data includes a plurality of indicator values indicating communication quality; and
said evaluating, for the first communications system, selects an indicator used for determination of uplink and an indicator used for determination of downlink independently of each other.

6. The handover control method according to claim 1, wherein:
the measurement data includes a plurality of indicator values indicating communication quality; and
said evaluating for the first communications system determines optimal first base stations based on values calculated by weighting the plurality of indicator values.

7. The handover control method according to claim 1, wherein said determining determines which of the uplink and downlink requires a higher throughput, when the mobile station uses a data service involving bidirectional communication, and gives priority to the link determined as requiring a higher throughput.

8. The handover control method according to claim 1, wherein said determining gives priority to uplink, when the mobile station uses a data service involving bidirectional communication, and when remaining battery power of the mobile station is lower than a predetermined threshold.

9. A communication method for a mobile station which performs radio communication using a plurality of base stations, the communication method comprising:
collecting measurement data that indicates communication quality of uplink and downlink paths between the mobile station and each of a plurality of first base stations belonging to a first communications system, and that indicates communications quality of uplink and downlink paths between the mobile station and each of a plurality of second base stations belonging to a second communications system;
evaluating, which first base station is optimal for uplink, as well as which first base station is optimal for downlink, from among the first base stations belonging to the first communications system, and evaluating which second base station is optimal for uplink, as well as which second base station is optimal for downlink, from among the second base stations belonging to the second communications system, based on the collected measurement data;
determining which one of a plurality of communications systems including the first communications system and the second communications system is to be used and which link has priority, either uplink or downlink, according to a class of data services that the mobile station uses in radio communication, after both said evaluating for the first communications system and said evaluating for the second communications system are performed;
selecting, when the first communications system is determined to be used, as a target base station for handover the first base station that belongs to the first communications system and has been determined as being optimal for the link determined to have priority; and
selecting, when the second communications system is determined to be used, as a target base station for handover the second base station that belongs to the second communications system and has been determined as being optimal for the link determined to have priority.

10. The communication method according to claim 9, further comprising measuring communication quality of downlink, based on signals received from the first base stations and second base stations, and outputting measurement results as measurement data of downlink,
wherein said collecting collects measurement data of uplink from each first base station and each second base station, as well as the measurement data of downlink.

11. A communication method for a base station which communicates with a mobile station via radio waves, the base station being linked with other base stations via a network, the communication method comprising:
collecting measurement data that indicates communication quality of uplink and downlink paths between the mobile station and each of a plurality of first base stations belonging to a first communications system, and that indicates communication quality of uplink and downlink paths between the mobile station and each of a plurality of second base stations belonging to a second communications system;
evaluating which first base station is optimal for uplink, as well as which first base station is optimal for downlink, from among the first base stations belonging to the first communications system, and evaluating which second base station is optimal for uplink, as well as which second base station is optimal for downlink, from among the second base stations belonging to the second communications system, based on the collected measurement data;
determining which one of a plurality of communications systems including the first communications system and the second communications system is to be used and which link has priority, either uplink or downlink, according to a class of data services that the mobile station uses in radio communication, after both said evaluating for the first communications system and said evaluating for the second communications system are performed;
selecting, when the first communications system is determined to be used, as a target base station for handover the first base station that belongs to the first communications system and has been determined as being optimal for the link determined to have priority;
selecting, when the second communications system is determined to be used, as a target base station for handover the second base station that belongs to the second communications system and has been determined as being optimal for the link determined to have priority; and outputting a handover request requesting handover of the mobile station to the selected base station.

12. The communication method according to claim 11, further comprising:

measuring communication quality of an uplink path to the mobile station, based on a signal received from the mobile station; and outputting measurement results as the measurement data of uplink, wherein said collecting collects the measurement data of uplink from the base station and other base stations, and measurement data of downlink from the mobile station.

13. A handover control method for a handover control server linked, via a network, to a plurality of base stations which communicate with a mobile station via radio waves, the handover control method comprising:

collecting measurement data that indicates communication quality of uplink and downlink paths between the mobile station and each of a plurality of first base stations belonging to a first communications system, and that indicates communication quality of uplink and downlink paths between the mobile station and each of a plurality of second base stations belonging to a second communications system;

evaluating which first base station is optimal for uplink, as well as which first base station is optimal for downlink, from among the first base stations belonging to the first communications system, and evaluating which second base station is optimal for uplink, as well as which second base station is optimal for downlink, from among the second base stations belonging to the second communications system, based on the collected measurement data;

determining which one of a plurality of communications systems including the first communications system and the second communications system is to be used and which link has priority, either uplink or downlink, according to a class of data services that the mobile station uses in radio communication, after both said evaluating for the first communications system and said evaluating for the second communications system are performed;

selecting, when the first communications system is determined to be used, as a target base station for handover the first base station that belongs to the first communications system and has been determined as being optimal for the link determined to have priority;

selecting, when the second communications system is determined to be used, as a target base station for handover the second base station that belongs to the second communications system and has been determined as being optimal for the link determined to have priority; and outputting a handover request requesting handover of the mobile station to the selected base station.

14. The handover control method according to claim 13, wherein said collecting collects measurement data of uplink from each first base station and each second base station, as well as measurement data of downlink from the mobile station via a base station to which the mobile station is currently connected.

15. A handover control method executed by a handover control apparatus to select a target base station for handover of a mobile station from among a plurality of base stations, the handover control method comprising:

collecting measurement data indicating communication quality of uplink and downlink paths between a mobile station and each of a plurality of first base stations belonging to a first communications system, and that indicates communication quality of uplink and downlink paths between the mobile station and each of a plurality of second base stations belonging to a second communications system;

evaluating which first base station is optimal for uplink, as well as which first base station is optimal for downlink, from among the first base stations belonging to the first communications system, and evaluating which second base station is optimal for uplink, as well as which second base station is optimal for downlink, from among the second base stations belonging to the second communications system, based on the collected measurement data;

determining which one of a plurality of communications systems including the first communications system and the second communications system is to be used and which link has priority, either uplink or downlink, according to a class of data services that the mobile station uses in radio communication, after both said evaluating for the first communications system and said evaluating for the second communications system are performed;

selecting, when the first communications system is determined to be used, as a target base station for handover the first base station that belongs to the first communications system and has been determined as being optimal for the link determined to have priority; and selecting, when the second communications system is determined to be used, as a target base station for handover the second base station that belongs to the second communications system and has been determined as being optimal for the link determined to have priority.

* * * * *